US012784697B2

(12) United States Patent

Banik et al.

(10) Patent No.: US 12,784,697 B2

(45) Date of Patent: Nov. 3, 2026

(54) METHODS AND APPARATUS TO PERFORM PLATFORM AGNOSTIC CONTROL OF A DISPLAY USING A HARDWARE AGENT

(71) Applicant: Intel Corporation, Santa Clara, CA (US)

(72) Inventors: Subrata Banik, Bangalore (IN); Kunjal Parikh, Fremont, CA (US); Rajesh Poornachandran, Portland, OR (US); Maulik Vaghela, Bhavnagar (IN); Vincent Zimmer, Issaquah, WA (US)

(73) Assignee: Intel Products IP LLC, Santa Clara, CA (US)

( * ) Notice: Subject to any disclaimer, the term of this patent is extended or adjusted under 35 U.S.C. 154(b) by 243 days.

(21) Appl. No.: 17/560,124

(22) Filed: Dec. 22, 2021

(65) Prior Publication Data

US 2022/0189418 A1 Jun. 16, 2022

(51) Int. Cl.

*G09G 3/34* (2006.01)

*G06F 1/3218* (2019.01)

(Continued)

(52) U.S. Cl.

CPC ......... *G09G 3/3406* (2013.01); *G06F 1/3218* (2013.01); *G06F 1/3265* (2013.01);

(Continued)

(58) Field of Classification Search

CPC .. G09G 3/3406; G09G 5/10; G09G 2300/026; G09G 2300/0814;

(Continued)

(56) References Cited

U.S. PATENT DOCUMENTS

2002/0041280 A1* 4/2002 Woo ..................... G09G 3/3406 345/212

2003/0193472 A1 10/2003 Powell (Continued)

FOREIGN PATENT DOCUMENTS

TW 201512828 A * 4/2015 .......... B41J 2/14129

OTHER PUBLICATIONS

European Patent Office, “Extended European Search Report,” issued in connection with European Application No. 22206987.4, dated May 8, 2023, 9 pages.

(Continued)

*Primary Examiner* — Adam J Snyder

(74) *Attorney, Agent, or Firm* — Hanley, Flight & Zimmerman, LLC

(57) ABSTRACT

Methods, apparatus, systems, and articles of manufacture to perform platform agnostic control of a display using a hardware agent are disclosed. An example apparatus includes memory; instructions in the apparatus; and hardware agent to execute the instructions to: obtain a battery level; and during a boot protocol: determine that the battery level is below a threshold; determine a panel brightness based on the battery level, the panel brightness being less than a maximum brightness of the panel; and transmit instructions to a driver corresponding to the panel to cause the panel to operate at the determined amount of brightness.

25 Claims, 14 Drawing Sheets

(51) Int. Cl.
*G06F 1/3234* (2019.01)
*G09G 5/10* (2006.01)

(52) U.S. Cl.
CPC ......... *G09G 5/10* (2013.01); *G09G 2300/026* (2013.01); *G09G 2300/0814* (2013.01); *G09G 2320/0626* (2013.01); *G09G 2330/02* (2013.01); *G09G 2330/021* (2013.01); *G09G 2330/026* (2013.01); *G09G 2340/0435* (2013.01); *G09G 2360/18* (2013.01)

(58) Field of Classification Search
CPC ....... G09G 2320/0626; G09G 2330/02; G09G 2330/021; G09G 2330/026; G09G 2340/0435; G09G 2360/18; G06F 1/3218; G06F 1/3265
See application file for complete search history.

(56) References Cited

U.S. PATENT DOCUMENTS

| | | | | |
|---|---|---|---|---|
| 2006/0236144 | A1* | 10/2006 | Chao | G06F 1/3203 713/323 |
| 2011/0154007 | A1* | 6/2011 | Juvonen | G06F 9/4401 713/340 |
| 2012/0047358 | A1* | 2/2012 | Chung | G06F 9/4403 713/2 |
| 2012/0297224 | A1* | 11/2012 | Chen | G06F 1/3265 713/340 |
| 2015/0009122 | A1* | 1/2015 | Chou | G06F 1/1671 345/156 |
| 2015/0089210 | A1* | 3/2015 | Lai | G06F 9/4401 713/2 |
| 2016/0239062 | A1* | 8/2016 | Lee | G09G 3/342 |
| 2021/0357234 | A1 | 11/2021 | Banik | |

OTHER PUBLICATIONS

European Patent Office, “Communication pursuant to Article 94(3) EPC,” issued in connection with European Patent Application No. 22 206 987.4, dated Aug. 20, 2025, 6 pages.

* cited by examiner

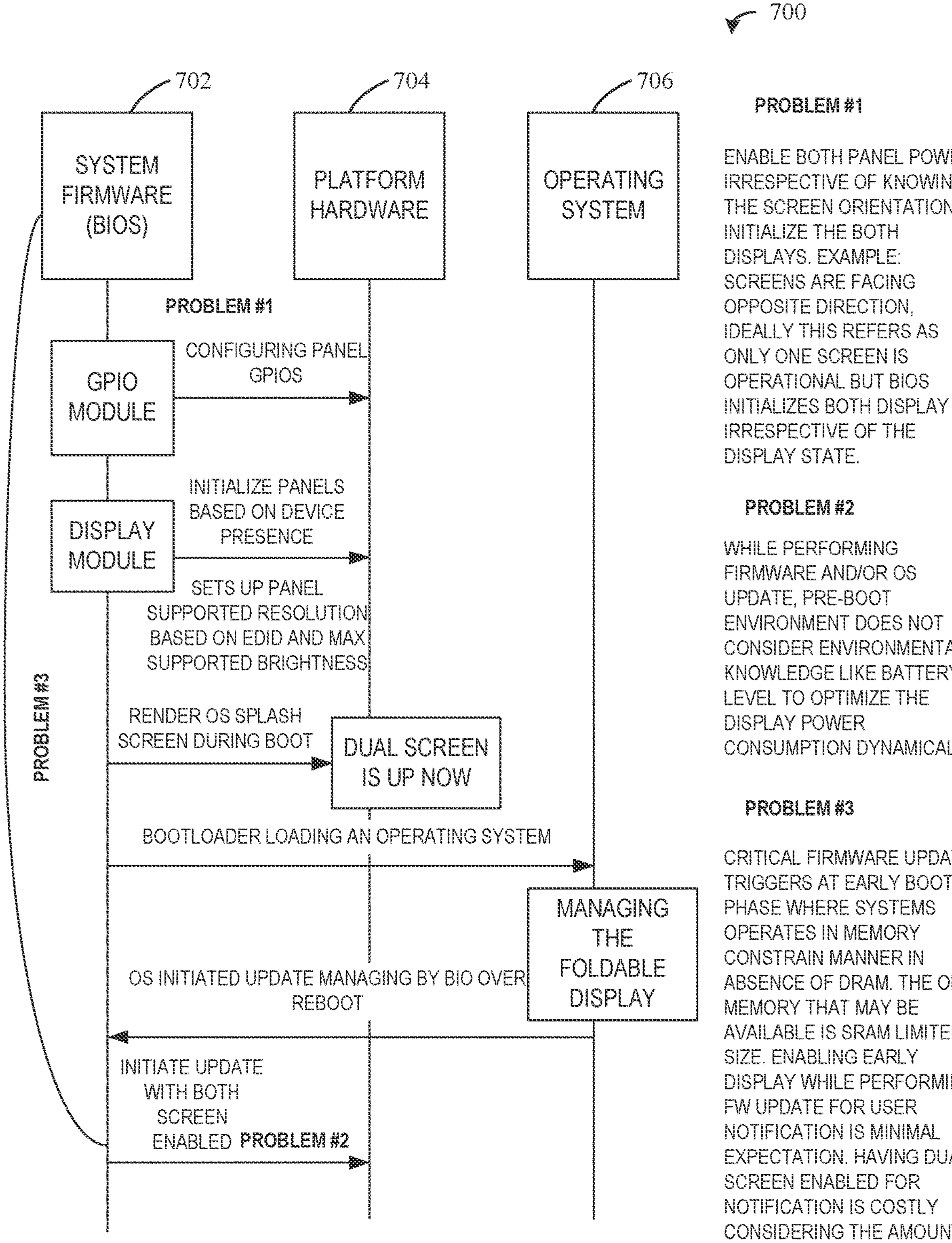

PROBLEM #1

ENABLE BOTH PANEL POWER IRRESPECTIVE OF KNOWING THE SCREEN ORIENTATION TO INITIALIZE THE BOTH DISPLAYS. EXAMPLE: SCREENS ARE FACING OPPOSITE DIRECTION, IDEALLY THIS REFERS AS ONLY ONE SCREEN IS OPERATIONAL BUT BIOS INITIALIZES BOTH DISPLAY IRRESPECTIVE OF THE DISPLAY STATE.

PROBLEM #2

WHILE PERFORMING FIRMWARE AND/OR OS UPDATE, PRE-BOOT ENVIRONMENT DOES NOT CONSIDER ENVIRONMENTAL KNOWLEDGE LIKE BATTERY LEVEL TO OPTIMIZE THE DISPLAY POWER CONSUMPTION DYNAMICALLY.

PROBLEM #3

CRITICAL FIRMWARE UPDATE TRIGGERS AT EARLY BOOT PHASE WHERE SYSTEMS OPERATES IN MEMORY CONSTRAIN MANNER IN ABSENCE OF DRAM. THE ONLY MEMORY THAT MAY BE AVAILABLE IS SRAM LIMITED IN SIZE. ENABLING EARLY DISPLAY WHILE PERFORMING FW UPDATE FOR USER NOTIFICATION IS MINIMAL EXPECTATION. HAVING DUAL SCREEN ENABLED FOR NOTIFICATION IS COSTLY CONSIDERING THE AMOUNT OF TEMPORARY MEMORY AVAILABLE.

FIG. 7

METHODS AND APPARATUS TO PERFORM PLATFORM AGNOSTIC CONTROL OF A DISPLAY USING A HARDWARE AGENT

FIELD OF THE DISCLOSURE

This disclosure relates generally to computing systems and, more particularly, to methods and apparatus to perform platform agnostic control of a display using a hardware agent.

BACKGROUND

Some computing devices include an operating system (OS) (e.g., software) that utilizes hardware to execute tasks. Additionally, such computing devices may include a basic input output system (BIOS) (e.g., firmware). The BIOS may perform hardware initializations during a boot or start up process. Additionally, the BIOS may provide runtime services to the OS. During particular stages (e.g., start-up, firmware updates, OS updates, boot protocols, blue screen of death, etc.), the BIOS may have control of the hardware and during runtime, the OS may have control of the hardware.

BRIEF DESCRIPTION OF THE DRAWINGS

FIG. 7 is an example timing diagram illustrating problems of conventional techniques.

DETAILED DESCRIPTION

Figure 1:
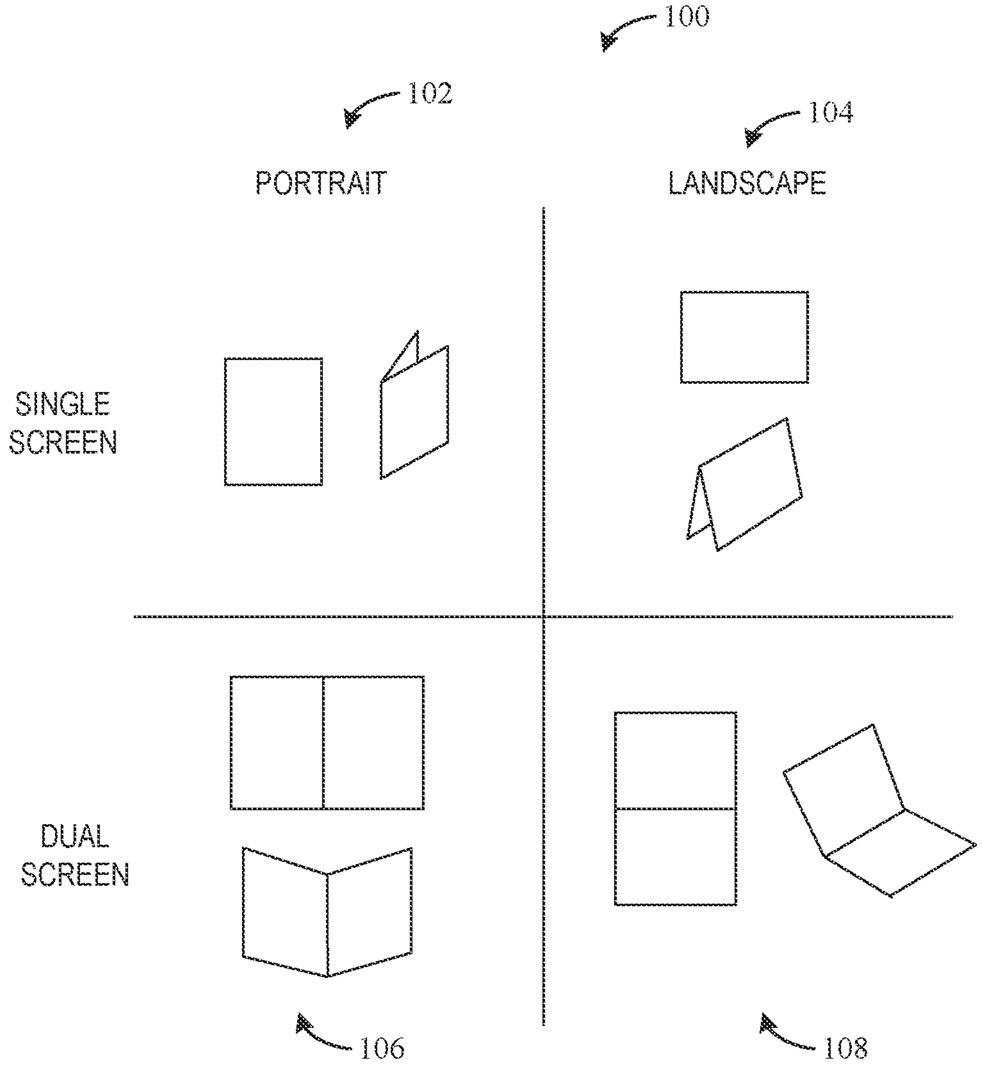
FIG. 1 illustrates example orientations of a dual screen computing device.

The figures are not to scale. Instead, the thickness of the layers or regions may be enlarged in the drawings. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As computing devices have developed, so has the technology of the displays/panels implemented in such computing devices. For example, computing devices (e.g., laptops, computers, smart phones, tablets, smart televisions, etc.) include panels capable of operating at high resolutions.

Some computing devices may include multiple screens. However, implementing one or more higher resolution panels on a computing device may result in additional power and/or memory consumption to control the additional pixels included in the higher resolution panels.

Conventional computing devices control operation of a panel and/or display using an operating system (OS). For example, the OS can conserve power and/or memory resources by turning the brightness of the display(s) down, turning the power of the display(s) off, downgrading the resolution, and/or downgrading the refresh rate and/or frames per second. The OS may use governing information (e.g., information obtained from a user and/or from one or more sensors) to determine how to manage the displays to conserve power. For example, the OS may disable a display based on the orientation of a dual-display, lower brightness when the ambient light is low, lower brightness when the battery power is low, etc. An example of different orientations of a dual screen that may result in different panel management is shown in FIG. 1. In FIG. 1, the dual screen computing device may be configured to a single screen in portrait mode 100, a single screen in landscape mode 102, a dual screen in portrait mode 104, and a dual screen in landscape mode 106. In such an example, a microcontroller can obtain information from one or more sensors corresponding to the angle of the dual displays with respect to one another (e.g., the hinge angle) to determine whether a user is operating the dual display in a single screen configuration or a dual screen configuration. In this manner, the computing system can turn off one of the displays in the single screen configuration to conserve power (since the user will likely not be using one of the displays when the computing device is configured as a single screen.

Although using governing data (e.g., battery power, hinge angle, ambient light, etc.) may conserve power and/or resources while the OS has control of the hardware of the computing device, such conservation does not occur in conventional computing devices when the OS does not have control (e.g., when firmware and/or the BIOS has control, such as during start-up, during boot processes, during firmware updates, during OS updates, etc.). In such conventional devices, when the firmware and/or BIOS is in control of the hardware, the panels are structured to operate at maximum power (e.g., full resolution, full brightness, highest refresh rate and/or frame rate, etc.). For example, during start-up (e.g., while the BIOS is initializing hardware), the BIOS may initialize the panel(s) towards the beginning of the process, so that the panel(s) can display information to let a user know that the device is starting up. Accordingly, most of the time under BIOS-control corresponds to the maximum resources to control the display, as further described below in conjunction with FIG. 2.

Figure 2:
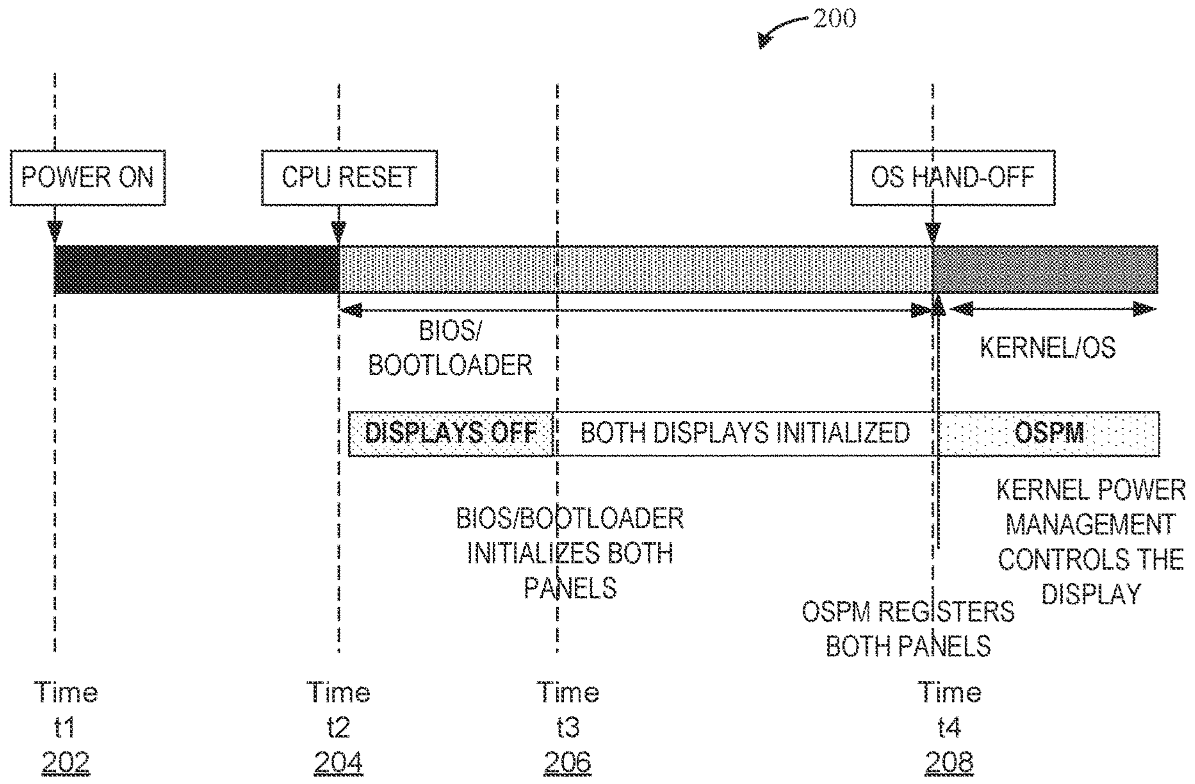
FIG. 2 illustrates an example timing diagram described in conjunction with examples disclosed herein.

FIG. 2 illustrates a timing diagram that shows an example start-up process 200 of a computing device with a dual panel. The start-up process 200 includes times t1-t4 202, 204, 206, 208. At time t1 202, the computing device is turned on. At time t2 204, the CPU of the computing device resets and the BIOS and/or a bootloader controls the hardware of the computing device. At time t3 206, the BIOS/bootloader initializes both panels. From time t3 206 to t4 208, the panels are operating at full power (full brightness, full resolution, etc.) for conventional computing devices, thereby utilizing significant power and memory resources. During a startup and/or at other points in time, power and resources may be limited. For example, the total power from a system-on-chip that is available during a boot protocol may be limited to 15 Watts (W) (5 voltage*3 Amps). However, the amount of power consumed by a high-end or mid-range display panel is above 6 W. Accordingly, a dual display at full power consumes over 12 W of the total 15 W available for the BIOS to initiate hardware between times t3 and t4 206, 208. Additionally, between t3 and t4 206, 208 the amount of memory available for the BIOS to use may be limited (because DRAM or other memory may not be initiated and/or available). In some examples, the amount of available memory may be less than the memory needed to operate the dual display. Because traditional computing devices have the OS perform power management protocols for panel(s), there is no opportunity to power manage the panel(s) when (a) the OS is busy with other tasks and/or (b) when the OS is not in control (e.g., when the BIOS controls the hardware). Accordingly, the lack of power management of panel(s) when the OS of a conventional computing device is busy and/or not in control of the hardware may result in depletion of battery, increased boot times, and/or errors.

Examples disclosed herein provide hardware with offloaded decision making (e.g., from a host CPU/OS to a hardware agent) and dynamical panel management to control panels using the hardware agent. In this manner, the operation of one or more panels may be controlled to reduce power consumption and/or memory consumption when the OS is busy and/or during a boot protocol and/or any other time BIOS/firmware is in control. Additionally, by offloading decision making from the host CPU/OS to the hardware agent, primary cores can enter power save states and/or do other general purpose processing, Examples disclosed herein use a governing agent to monitor underlying hardware to gather environment sensor information (e.g., amount of battery power left, ambient light, hinge angle information, panel orientation information, etc.) and host CPU (e.g., OS) initiated command based communication to determine how to perform display management at a pre-memory phase for firmware updates (e.g., when power and/or memory resources may be limited). The governing information may be obtained by a microcontroller and feed directly or indirectly (e.g., via a universal serial bus (USB) interface) to the hardware agent to inform the power management of the panel(s). The hardware agent includes a timing controller (TCON) to control the panel backlight or control each pixel to define how much back light to emit for organic light emitting diode (OLED) displays to increase power efficiency. Additionally, examples disclosed herein use panel specific data to instruct the firmware/software to dynamically manage the display user interface to adjust resolution to mitigate high memory requirements for the panel(s).

Using examples disclosed herein, power and memory resources are conserved when the OS is busy and/or when the OS is not in control of the hardware. Accordingly, examples disclosed herein may be able to perform start-up protocols, firmware updates, OS updates, etc. with less battery power than conventional computing devices. Additionally, examples disclosed herein can recover computing devices with USB-C as power deliver in low or dead battery modes. Additionally, examples disclosed herein save latency at the CPU-side. Additionally, examples disclosed herein are OS agnostic and can be implemented in any type of computing device that includes a panel. In this manner, future innovation can be managed with examples disclosed herein. Additionally, performing panel management outside of the OS reduces OS maintenance needed if the management was performed on the OS. Although examples disclosed herein are described in conjunction with a dual panel, examples disclosed herein may be described in conjunction with a computing device with any number of panels.

Figure 3:
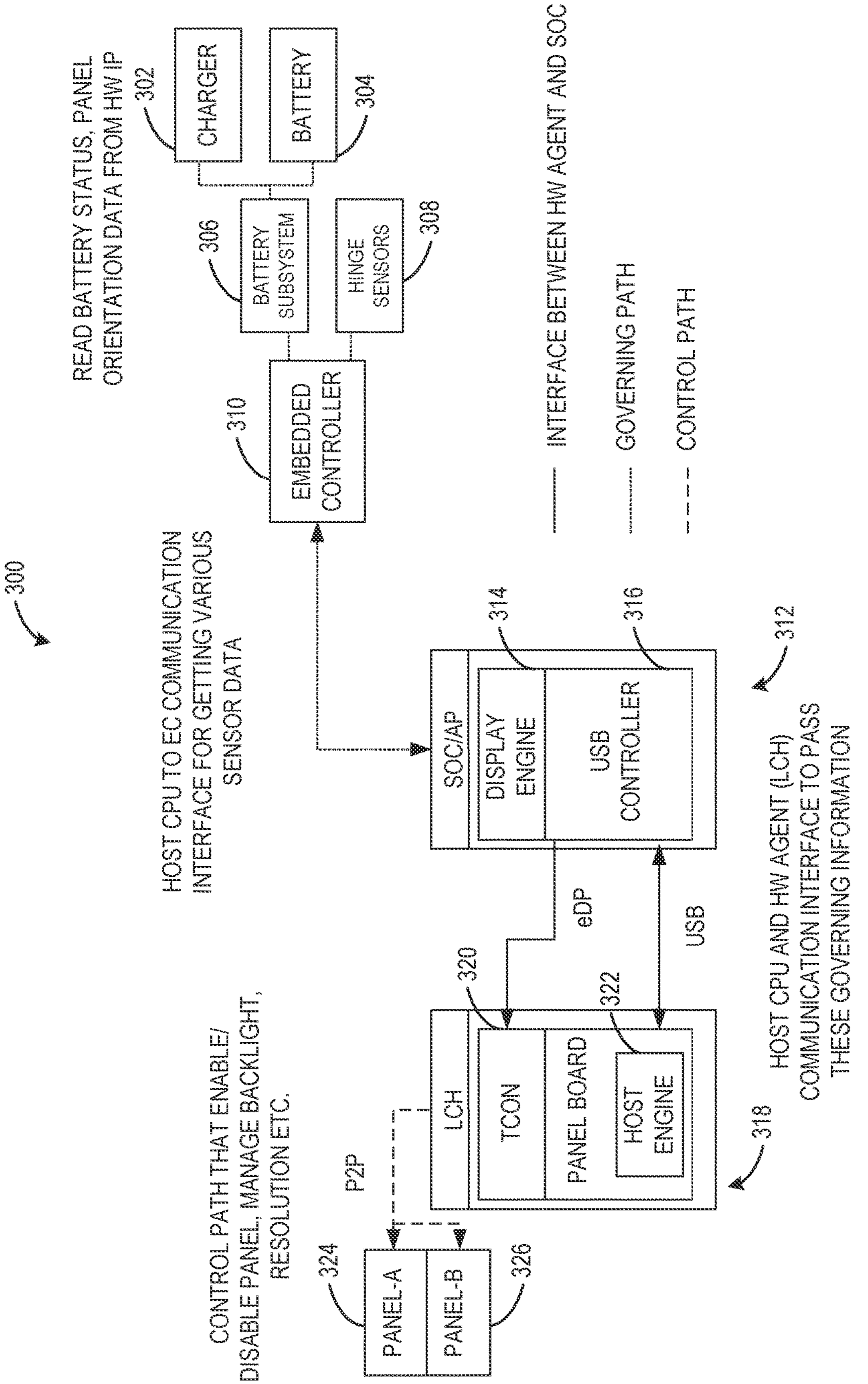
FIG. 3 is a block diagram of an implementation of the example computing device described in conjunction with examples disclosed herein.

FIG. 3 is a block diagram of hardware of an example computing device 300. The example computing device 300 includes an example charger 302, an example battery 304, an example battery subsystem 306, example hinge sensor(s) 308, an example embedded controller 310, an example system-on-chip (SoC) and/or application processor (AP) 312, an example display engine circuitry 314, an example USB controller 316, an example hardware agent 318, an example timing controller (TCON) 320, an example host engine 322, and example panels 324, 326.

The example charger 302 of FIG. 3 is a wired or wireless charger of the computing device 300. For example, the charger 302 is hardware that obtains power from an external device (e.g., a plug, another device, etc.) via an interface (e.g., wired or wireless interface). For example, when the computing device 300 is plugged into a wall outlet, the charger 302 obtains power from the electricity output from the wall outlet. The example battery 304 is a battery that powers the computing device 300 when the charger 302 is not being used (e.g., when an external power source is not being used to power and/or charge the computing device 300). The battery subsystem 306 is coupled to the charger 302 and the battery 304. The battery subsystem 306 controls the power obtained via the charger 302 and/or battery 304 and can provide information to the example embedded controller 310 regarding use of the charger 302 and/or battery 304. The example hinge sensors 308 obtain information related to the angle of the panels 324, 326 with respect to one another (e.g., the hinge angle information). The example hinge sensors 308 provide the hinge angle information to the example embedded controller 310. In some examples, other sensors may be additionally or alternatively be implemented by the example computing device 300 (e.g., ambient light sensor).

The example embedded controller 310 of FIG. 3 is hardware coupled to the example battery subsystem 306, the example hinge sensor(s) 308 and/or any other sensors. Additionally, in the example of FIG. 3 the embedded controller 310 is coupled to the example SoC/AP 312. However, in some examples the embedded controller 310 may additionally and/or alternatively be coupled directly to the example hardware agent 318. In some examples, the embedded controller 310 is a microcontroller, integrated sensor hub, and/or any other processing device. The example embedded controller 310 manages sensor components of the computing device 300 by gathering environmental sensing data (e.g., hinge sensor readings, battery capacity, charger state, and/or other relevant platform sensor information) from the connected components. The example embedded controller 310 may process the information to determine different statuses of the computing device 300 (e.g., whether the charger 302 is enabled, amount of battery power left, amount of time before the battery is depleted, angle of panels, amount of ambient light, etc.). The embedded controller 310 transmits the obtained and/or processed governing data related to the sensors to the example SoC/AP 312 and/or the hardware agent 318 (e.g., directly or indirectly).

The example SoC/AP 312 of FIG. 3 is and/or includes the host central processing unit (CPU) that implements the OS and a BIOS that implements firmware. The SoC/AP 312 may also be or include a host system and/or a main motherboard. The example SoC/AP 312 is coupled to the example embedded controller 210 and the example hardware agent 318. The example SoC/AP 312 receives information from the embedded controller 310 (e.g., periodically, aperiodically, or based on a command and/or request from the host). Additionally, the example SoC/AP 312 provides a dedicated path between governing (e.g., corresponding to obtaining and/or processing sensor data, battery data, charger data, etc.) and controlling (e.g., controlling operation of the example panels 324, 326). The example SoC/AP 312 includes the example display engine circuitry 314 and the example USB controller 316.

The example display engine circuitry 314 provides a communication channel for passing information to the hardware agent 318. In some examples, the display engine circuitry 314 is an/or includes a host embedded controller interface (HECI) driver, as further described below in conjunction with FIG. 4. While the computing device 300 is booting, the system firmware may allocate a portion of memory (e.g., a buffer) that can be used for communication between the host SoC/AP 312 and the hardware agent 318. The example display engine circuitry 314 may send a command to inform the hardware agent 318 about an OS initiated boot path (e.g., such as a critical booth path, a recovery mode, a firmware update, a software update, etc.), so that the hardware agent 318 can power manage the panels 324, 326 independent of the OS. Additionally, the example display engine circuitry 314 can initiate firmware updates corresponding to the hardware agent 318 from the host CPU software and/or firmware layer.

The USB controller 316 of FIG. 3 is a bi-directional interface between the host SoC/AP 312 and the hardware agent 318. The example USB controller 316 may be and/or include a driver and/or interface to obtain the governing information (e.g., also referred to as device state information) from the embedded controller 310. Additionally, the example USB controller 316 can inform the hardware agent 318 that the system is going into a boot path and/or that the hardware agent may need to control the computing device 300. In some examples, the USB controller 316 can convert any communication into USB while interfacing with the example hardware agent 318. For example, when a time slicing threaded implementation running on the hardware agent 318 queries the host SoC/AP 312 to know the device is using a get device state control transfer command, the example USB controller 316 can return governing information and/or device state information from the embedded controller 310. Additionally, the USB controller 316 may include a USB bridge driver to convert HECI messages into USB host commands while communicating with the hardware agent 318. Although the example USB controller 316 communicates over a USB protocol, the USB controller 316 can communicate over any type of protocol.

The example hardware agent 318 is OS agnostic hardware that controls the panels 324, 326 using governing information from the embedded controller 310. The example hardware agent 318 is coupled to the SoC/AP 312 and the panels 324, 326. In some examples, the hardware agent 318 may also be coupled to the example embedded controller 310. The hardware agent 318 is also referred to as a lid controller HUB (LCH). The hardware agent 318 can be implemented by firmware (e.g., programmable service engine (PSE) firmware) to interface with the host SoC/AP 312 over the USB protocol to obtain device environmental information (e.g., governing information such as hinge angles, battery information, charge information, etc.). Additionally, the example hardware agent 318 manages the example panels 324, 326 based on the obtained environmental information when the OS is not in control of hardware. In some examples, the hardware agent 318 obtains comments on how to control the panels 324, 326 from the OS operating on the SoC/AP 312. Additionally, the hardware agent 318 can detect boot environment conditions (e.g., low power booting, low battery, dead battery, S5 charging) based on the device state information and OS driver recovery, firmware software updates, etc. based on OS initiated HECI commands to be able to control the panels 324, 326. The example hardware agent 318 includes the example TCON 320 and the example host engine 322.

The example TCON 320 of FIG. 3 controls the panels 324, 326 (e.g., to enable/disable panels, adjust the backlight, change resolution, etc.) to conserve power based on obtained governing information. The example TCON circuitry may execute firmware to control the display panel power independent of any high-level driver. For example, when a user switches to a single screen display, the TCON 320 can turn off one of the panels 324, 326. The TCON 320 may trigger a general purpose event (GPE) so that a DPI handler can inform the SoC/AP 312 to update its state (e.g., to modify the OS user interface based on the updated framebuffer). When reducing brightness, the example TCON 320 can read a panel type from a panel identifier (e.g., extended display identification (EDID)) and configuration EPROM to control the backlight based on the panel type (e.g., control LCD backlight or dynamically formal pixel for OLED). The example TCON 320 is further described below in conjunction with FIG. 6.

The example host engine 322 of FIG. 3 transmits commands and/or queries to the example host SoC/AP 312 to obtain device state information (e.g., governing state information corresponding to information sensed by the sensors, charger, battery, available memory, etc.) using a get_device_state control transfer command via the USB controller 316. The example host engine 322 may include a communication driver (e.g., a USB driver) to use a USB-based communication or any other communication to obtain the device state information. As described above, the SoC/AP 312 may include a USB bridge driver to convert any communication into USB while interfacing with the hardware agent 318.

The example panels 324, 326 of FIG. 3 are display panels that are capable of displaying an image, text, color, etc. The panels 324, 326 may include any number of pixels (e.g., lights) that when controlled make up an image. The more the pixels, the higher the potential resolution. However, the resolution can be dynamically downgraded from the potential resolution by transmitting a single color value to a group of neighboring pixels (e.g., when memory is low). The panels 324, 326 may include an liquid clear display (LCD) backlight that can be controlled to adjust the brightness of the pixels. In some examples (e.g., for organic light emitting diode (OLED) displays), the brightness of the panels 324, 326 can be adjusted based on the formatting of the pixel as black pixels. Although the example of FIG. 3 includes two panels, examples disclosed herein can be utilized in conjunction with any number of panels, including a single panel or multiple panels. Additionally, the example panels 324, 326 may be any configuration of panels, including detachable panels, foldable panels, wireless panels, etc.

Figure 4:
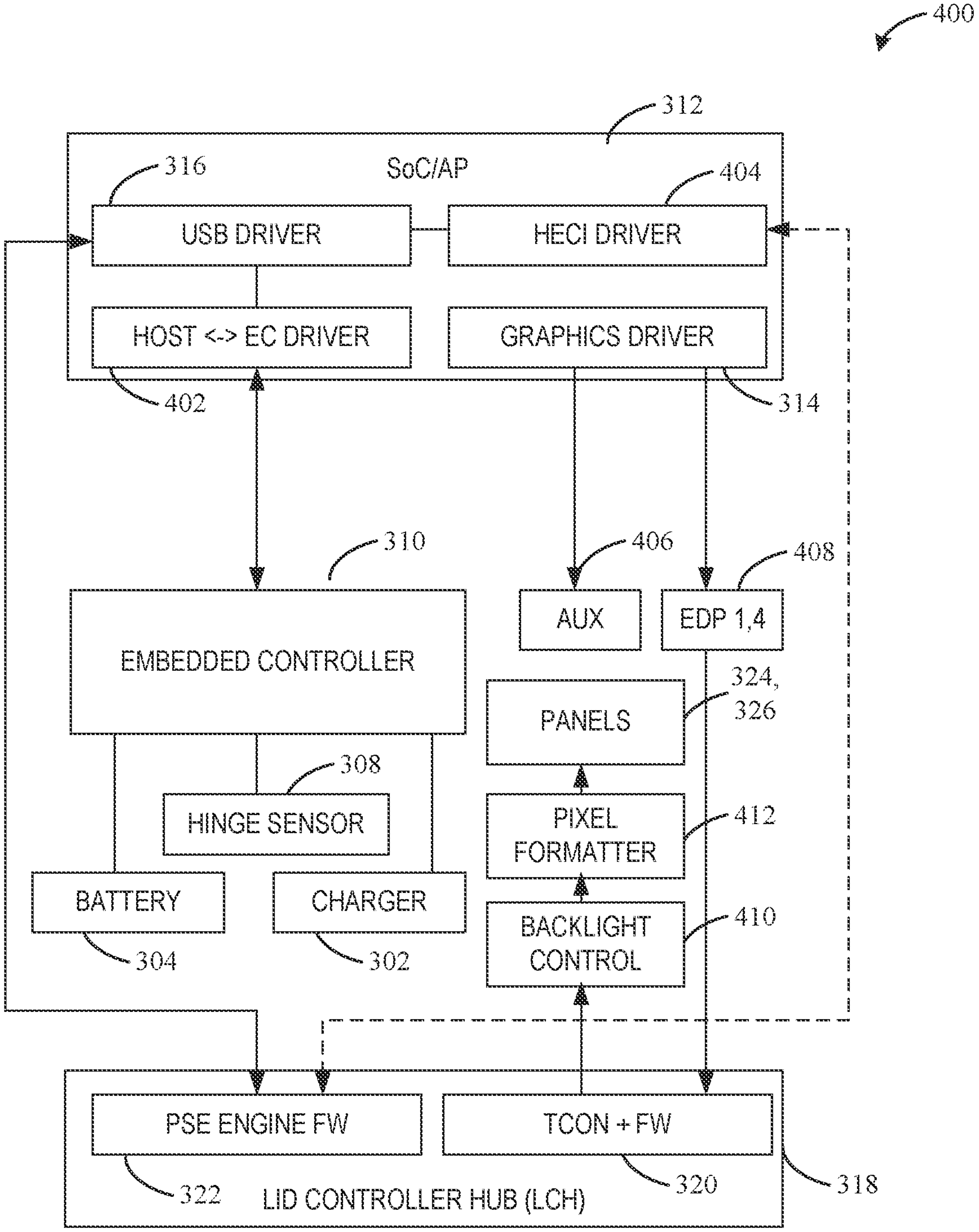
FIG. 4 is an additional and/or alternative implementation of the example computing device of FIG. 3.

FIG. 4 illustrates an additional and/or alternative block diagram of an example computing device 400. The components of the computing device 400 may be in addition to and/or an alternative of the components of the example computing device 300 of FIG. 3. In some examples, the computing device 400 is the computing device 300 of FIG. 3. The example computing device 400 includes the example charger 302, the example battery 304, the example hinge sensor 308, the example embedded controller 310, the example SoC/AP 312, the example display engine circuitry 314 (e.g., shown as a graphics driver), the example USB controller 316, the example hardware agent 318 (e.g., shown as a LCH), the example TCON 320, the example host engine 322 (e.g., shown as a PSE engine), and the example panels 324, 326 of FIG. 3. The computing device 400 further includes an example host to embedded controller (EC) driver 402, an example HECI driver 404, an example AUX 406, an example eDP 408, example backlight control circuitry 410, and example pixel format circuitry 412. In some examples, the backlight control circuitry 410 and the pixel format circuitry 410 is included in the example hardware agent 318.

The example host-to-EC driver 402 of FIG. 4 communicates with the example embedded controller 310 and/or any other sensor controller to obtain governing information. In some examples, the host-to-EC driver 402 is an interface. In some examples, if the embedded controller 310 is being used to connect to platform sensors, then the host-to-EC driver 402 can be used as part of the OS kernel or as part of system firmware (e.g., BIOS) while obtaining data from the sensor devices.

The example graphics driver circuitry 314 of FIG. 4 initiates the panel devices 324, 326, maps the framebuffer memory into a memory map of the host SoC/AP 312, and renders an image on the panels 324, 326 using the memory map as part of an OS or firmware (FW) stack. In some examples, the graphics driver circuitry 314 does not provide power management (e.g., brightness adjustment, panel enable/disable, resolution adjustment, etc.) for the panels 324, 326 because the hardware agent 318 provides the power management for the panels 324, 326. In some examples, the graphics driver circuitry 314 may provide power management at some points in time (e.g., when the OS has control of the hardware). When there is a change in panel device state (based on control of the hardware agent 318), the hardware agent 318 generates a GPE so that the SoC/AP 312 (e.g., a SCI driver or a low-level ACPI implementation included in the SoC/AP 312) can notify the example graphics driver circuitry 314 about the potential change in the display device so that the graphics driver circuitry 314 can adjust display on the panel(s) 324, 326 accordingly. For example, when a user changes from a dual screen configuration to a single screen configuration, the example hardware agent 318 may turn off one of the panels 324, 326 and outputs a GPE corresponding to the panel being turned off. In this manner, the graphics driver circuitry 314 can adjust display to a single display (e.g., to fit the display resolution on the single screens). The example graphics driver circuitry 314 may communicate with the TCON 320 via the AUX port 406 and/or eDP port 408.

As described above, the USB controller 316 transmits obtained governing information related to the battery 304, charger 302, hinge sensor 308, and/or any other sensor (e.g., via the embedded controller 310) to the example host (e.g., PSE) engine 322. The example TCON 320 uses the governing information to power manage the panels 324, 326 using the backlight control circuitry 410 and/or the pixel format circuitry 412 whenever the HECI driver 404 sends information corresponding to a special event (e.g., when the OS may not have control over hardware, such as a firmware-based protocol, a boot, a firmware and/or software update, OS update, reboot, post-firmware and/or OS update, a blue screen of death, etc.). For example, the HECI driver 404 can enter information into a buffer of the hardware agent 318 to trigger a firmware controlled power management protocol of the panels 324, 326 (e.g., even when the OS does not have control of the hardware). The example backlight control circuitry 410 and the example pixel format circuitry 412 is further described below in conjunction with FIG. 5.

Figure 5:
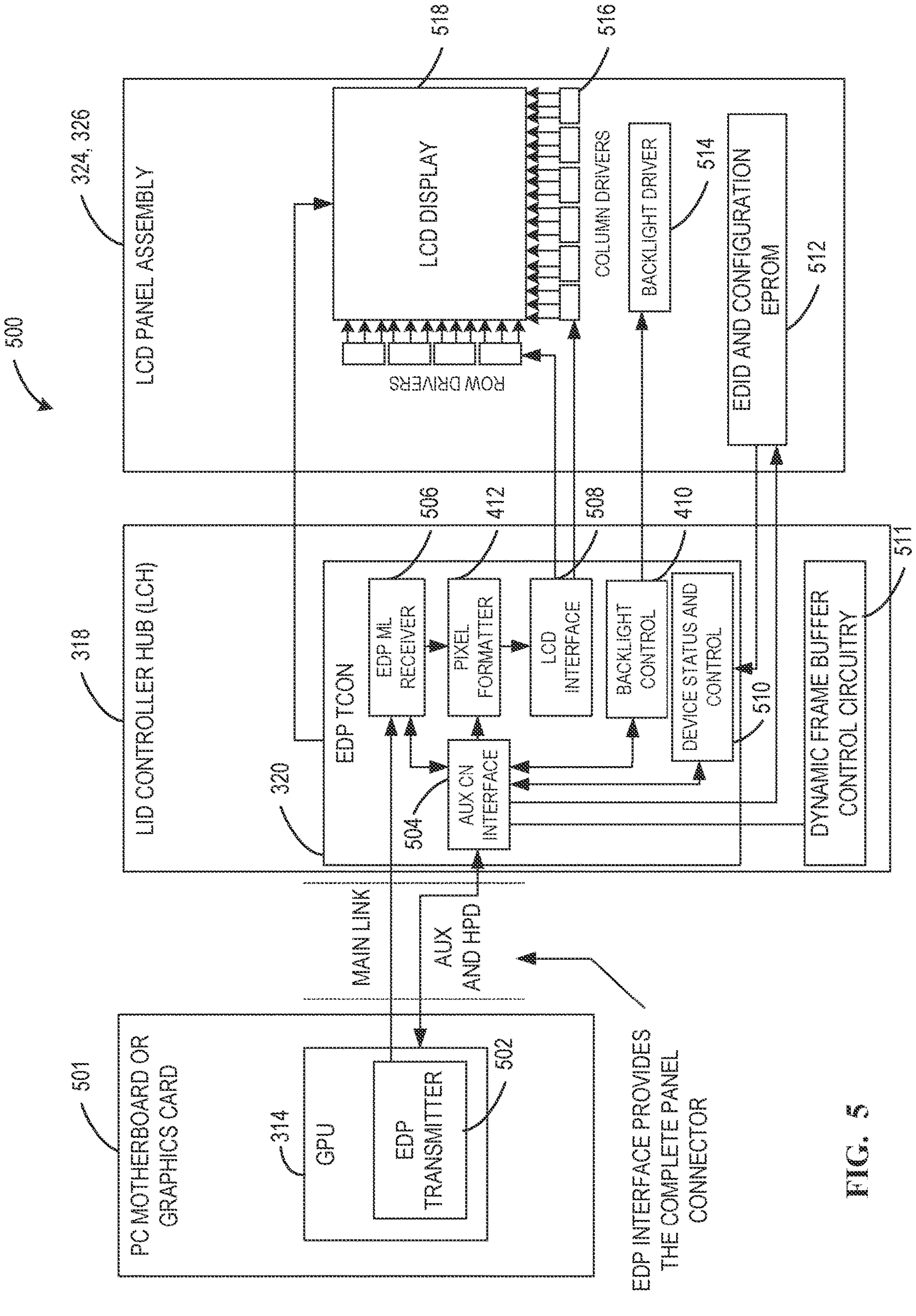
FIG. 5 is an additional and/or alternative implementation of the example computing device of FIGS. 3 and/or 4.

FIG. 5 illustrates an additional and/or alternative block diagram of an example computing device 500. The components of the computing device 500 may be in addition to and/or an alternative of the components of the example computing device 300 of FIG. 3 and/or the example computing device 400 of FIG. 4. In some examples, the computing device 300 is the computing device 300 of FIG. 3 and/or the computing device 400 of FIG. 4. The example computing device 500 includes the example display engine circuitry 314 (e.g., shown as a graphics processing unit (GPU)), the example hardware agent 318 (e.g., shown as a LCH), the example TCON 320, and one of the example panels 324, 325 (e.g., shown as an LCD panel assembly). The example computing device 500 further includes the example pixel format circuitry 412 and the example backlight control circuitry 410 of FIG. 4. The example computing device 500 further includes an example PC motherboard/graphics card 501, an example eDP transmitter 502, an example AUX channel interface 504, an example eDP receiver 506, an example LCD interface 508, example device status and control circuitry 510, example memory 512, an example backlight driver 514, example pixel drivers 516, and an example LCD display 518.

The example PC motherboard or graphics card 501 of FIG. 5 is included in the example SoC/AP 312. The PC motherboard or graphics card 501 includes the example display engine circuitry 314 implemented as a graphical processor unit (GPU). However, the display engine circuitry 314 can be implemented as any type of processing device. The example display engine circuitry 314 includes the example eDP transmitter 502. The eDP transmitter 502 is an interface that communications with the example TCON 320 via an eDP interface (e.g., including a main link and an AUX/HPD link). In some examples, the eDP transmitter 502 may include and/or be implemented by the HECI driver 404 and/or the graphics driver circuitry 314 of FIGS. 3 and/or 4.

As described above in conjunction with FIG. 3, the example TCON 320 can execute firmware to control the example panels 324, 326 based on the obtained governing information. The example TCON 320 can send control signals to the example backlight control 410 and/or the example pixel format circuitry 412 to adjust the brightness, state (e.g., enabled or disabled), resolution, etc. of the pixels of the panels 324, 326. Additionally, the example TCON 320 provides the power rails for the example LCD display 518. The example TCON 320 of FIG. 5 includes the example AUX channel interface 504 to communicate with the display engine circuitry 314 via the AUX and/or HPD link and the example eDP receiver 506 to communicate with the display engine circuitry 314 via the main link. The AUX link may be used to transmit audio over display initialization information. As further described above, the governing data from the example SoC 312 can be obtained from the USB interface 316 via the host engine 322.

The example pixel format circuitry 412 of FIG. 4 executes firmware instructions to determine what colors to output for individual pixels or groups of pixels to display an image based on the image information obtained via the main link. The example LCD interface 508 passes the color information to the row and column drivers 516 of the example panels 324, 326 to cause the corresponding pixels of the LCD display 518 to output the selected colors corresponding to an image.

The example backlight control circuitry 410 of FIG. 5 executes firmware instructions to determine how much to adjust the brightness of the LCD display 518 and outputs a value to the example backlight driver 514 of the LCD panel assembly 324, 326 corresponding to the desired brightness (e.g., more brightness consuming more power and less brightness consuming less power). The backlight control circuitry 410 determines a panel brightness (e.g., the amount of brightness for the LCD display 518) based on the governing data (e.g., from the sensor(s), battery, charger, etc. of the computing device 300, 400, 500). In some examples, the backlight control circuitry 410 can transmit instructions to turn off the backlight to disable the LCD display 518.

The example device status and control circuitry 510 of FIG. 5 can access a panel type from the example memory 512 (e.g., EDID and configuration EPROM) of the LCD panel assembly 324, 326 to determine information related to the panel assembly 324, 326. As described above, control of the panels 324, 326 is based on the panel type. For example, an OLED-based panel may dynamically format the pixels so that some of the pixels of the panel(s) 324, 326 are formatted with black pixels, whereas an LCD-based panel controls the backlight of the LCD display 518. Any one of the components of the example TCON 320 can obtain the governing data to make the various decisions on how to control the example panels 324, 326 via the example host engine 322 of FIGS. 3 and/or 4.

The example dynamic framebuffer control circuitry 511 of FIG. 5 executes firmware instructions to identify the amount of memory needed to render a frame on the enabled panels. Additionally, the dynamic framebuffer control circuitry 511 determines how much memory is available for the framebuffer. The framebuffer is a section of memory reserved for image data to be rendered on the one or more panels 324, 326. As described above, during some processes (e.g., boot, startup, reset, etc.) the amount of memory available may be limited. For example, during initialization of the hardware, the displays may be initiated before the the DRAM of the SoC/AP 312 is initiated, thereby limiting the amount of memory that can be used as a framebuffer. Accordingly, in some examples, the dynamic framebuffer control circuitry 511 may configure the framebuffer to support a low resolution (e.g., 640×480 Px resolution) by default to conserve memory. In such examples, the AUX interface 504 transmits the low resolution to the display engine circuitry 314 and/or graphics driver circuitry 314. In this manner, the display engine circuitry 314 and/or graphics driver circuitry 314 determines that the panels 324/326 are only capable of operating at the low resolution, even if that is not the case. The display engine circuitry 314 and/or graphics driver circuitry 314 will then generate image data at the low resolution, which requires less memory to store than a high resolution image, thereby saving memory resources. In some examples the dynamic framebuffer control circuitry 511 may determine which resolution to operate the panels under 324, 326 based on the available memory and the amount of memory needed to support the panels 324, 326. For example, if more than a first threshold amount of the available memory is needed, then the example dynamic framebuffer control circuitry 511 selects a first resolution to use for the panels 324, 326; if more than a second threshold amount of available memory is needed, then the example dynamic frame controller selects a second solution to use for the panels 324, 326; etc. In some examples, the dynamic framebuffer control circuitry 511 may additionally or alternatively transmit instructions to the SoC/AP 312 (e.g., via the AUX interface 504) to output the frame data at a refresh rate less than the maximum refresh rate to conserve memory and/or power resources.

After the dynamic framebuffer control circuitry 511 transmits the lower resolution to the SoC/AP 312 (e.g., via the AUX channel interface 504) the system firmware (e.g., BIOS) uses the limited framebuffer to render any screen for user communication. After additional memory is available (e.g., the DRAM and/or main memory becomes initialized), the BIOS of the SoC/AP 312 transmits a HECI command to inform the hardware agent 318 that additional memory is available so that the dynamic framebuffer control circuitry 511 can inform the display engine circuitry 314 to increase the resolution to a higher resolution or the maximum resolution of the panels 324, 326 (e.g., based on the EDID information).

While an example manner of implementing the hardware agent 318 of FIG. 3 is illustrated in FIGS. 3-5, one or more of the elements, processes, and/or devices illustrated in FIG. 3-5 may be combined, divided, re-arranged, omitted, eliminated, and/or implemented in any other way. Further, the host engine 322, the example pixel format circuitry 412, the example backlight control circuitry 410, the AUX channel interface 504, the example eDP receiver 506, the example LCD interface 508, the example device status and control circuitry 510, and the example dynamic framebuffer control circuitry 511, and/or, more generally, the hardware agent 318 of FIGS. 3-5, may be implemented by hardware, software, firmware, and/or any combination of hardware, software, and/or firmware. Thus, for example, any of the host engine 322, the example pixel format circuitry 412, the example backlight control circuitry 410, the AUX channel interface 504, the example eDP receiver 506, the example LCD interface 508, the example device status and control circuitry 510, and the example dynamic framebuffer control circuitry 511, and/or, more generally, the hardware agent 318 of FIGS. 3-5, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, the hardware agent 318 of FIGS. 3-5 is/are hereby expressly defined to include a non-transitory computer readable storage device or storage disk such as a memory, a digital versatile disk (DVD), a compact disk (CD), a Blu-ray disk, etc., including the software and/or firmware. Further still, the hardware agent 318 of FIGS. 3-5 may include one or more elements, processes, and/or devices in addition to, or instead of, those illustrated in FIG. 3-5, and/or may include more than one of any or all of the illustrated elements, processes, and devices.

Figure 6A:
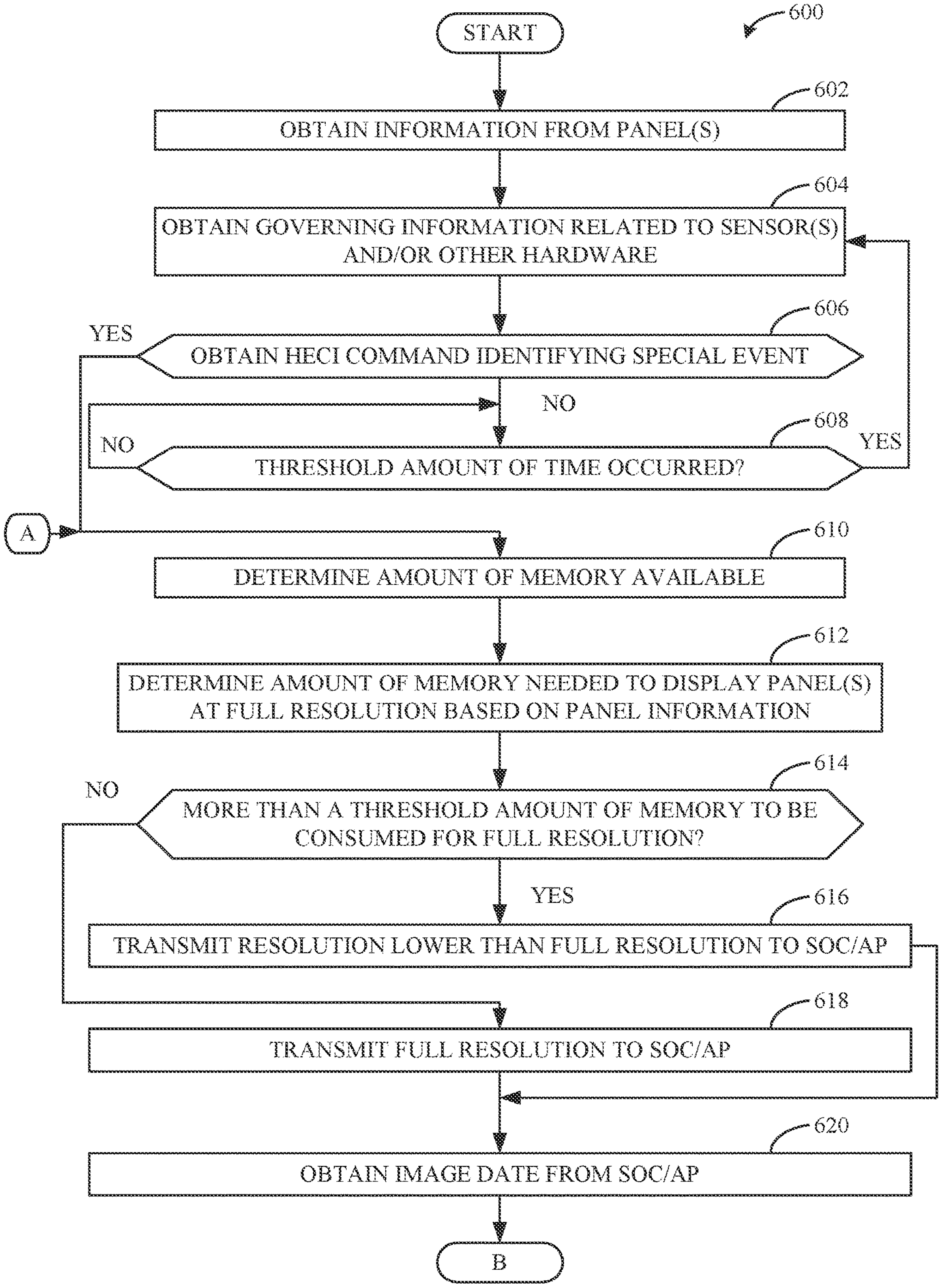
FIGS. 6A-6C illustrates a flowchart representative of example machine readable instructions that may be executed by example processor circuitry to implement the hardware agent of FIGS. 3-4.
Figure 6B:
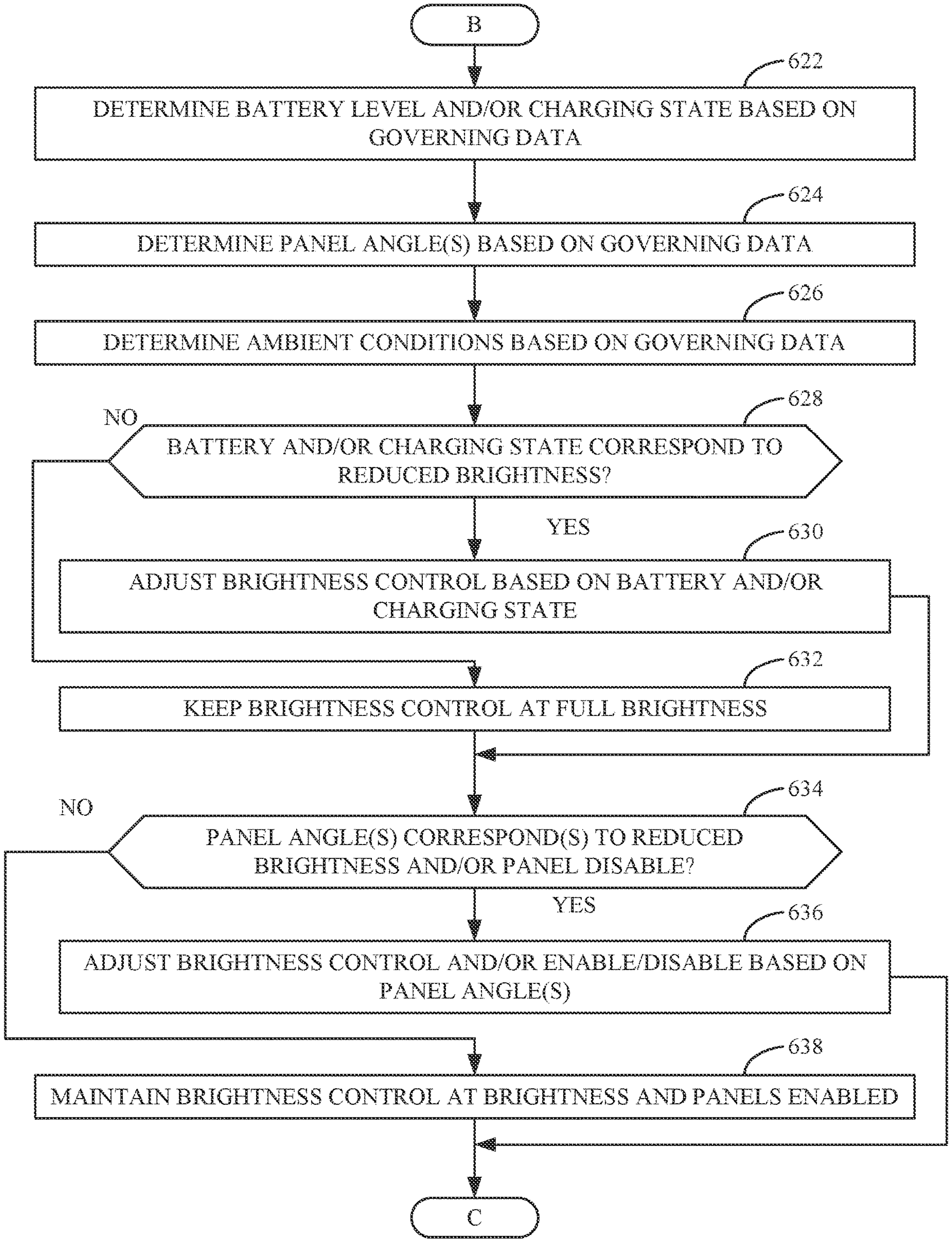
Figure 6C:
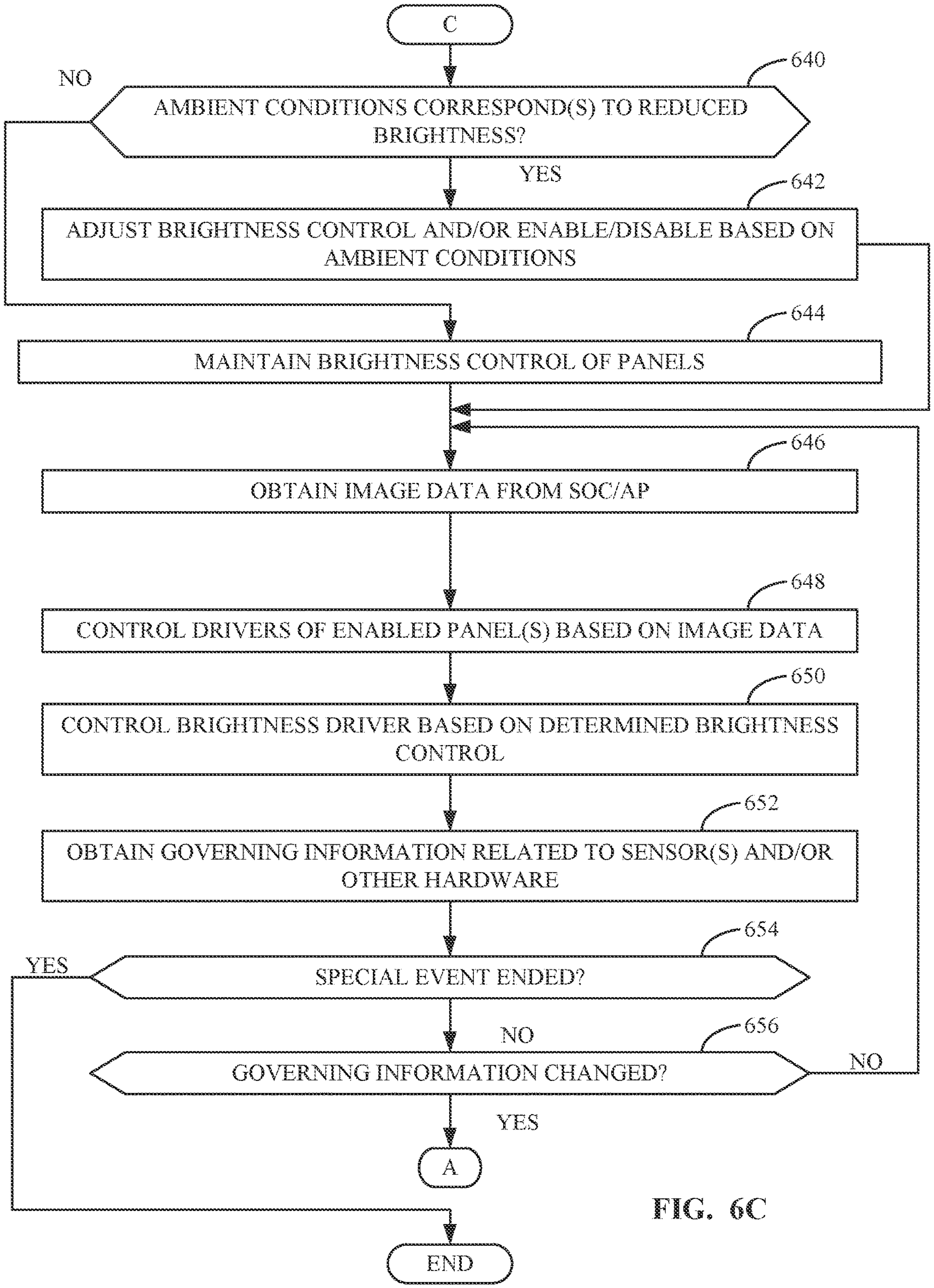

Flowcharts representative of example hardware logic circuitry, machine readable instructions, hardware implemented state machines, and/or any combination thereof for implementing the hardware agent 318 of FIGS. 3-5 are shown in FIGS. 6A-6C. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIG. 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 6A-6C, many other methods of implementing hardware agent 318 of FIGS. 1-2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware (e.g., firmware instructions). The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 6A-6C may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIGS. 6A-6D illustrate a flowchart representative of example machine readable instructions and/or example operations 600 that may be executed and/or instantiated by processing circuitry (e.g., the example hardware agent 318 of FIGS. 6A-6C) to power manage panels using firmware instructions. The instructions begin at block 602 when the example device status and control circuitry 510 obtains information from the panel(s) 324, 326. For example, the device status and control circuitry 510 may receive a panel identifier, a panel type, and/or other information related to the panel 324, 326. The example device status and control circuitry 510 can determine the full resolution of the panel 324, 326, the type of panel (e.g., OLED, LCD, etc.), etc. based on the obtained information.

At block 604, the example host engine 322 obtains the governing data (e.g., via host engine 322) related to sensor(s) (e.g., hinge sensor, light sensor, camera, etc.) and/or other hardware (e.g., battery, charger, memory, etc.). As described above, the governing information includes data related to hardware included in and/or connected to the SoC/AP 312 (e.g., battery data, charger data, sensor data, available memory data, etc.). The example host engine 322 transmits requests for governing data from the example SoC 312 and/or the embedded controller 310 periodically, aperiodically, and/or based on a trigger. In response to the request, the example USB controller 316 of the SoC 312 or the embedded controller 310 can transmit the governing data (e.g., via a USB communication). The host engine 322 provides the governing data to the components of the TCON 320 so that the TCON 320 can make power management decisions corresponding to the panels 324, 326 based on the governing data.

At block 606, the example host engine 322 determines if a HECI command has been obtained that identifies a special event. As described above, a special event may be an event in which the OS does not have control of the hardware (e.g., firmware and/or BIOS has control of hardware). For example, special events may include startup, boot protocols firmware updates, OS updates, post-firmware updates, post OS updates, reboot, recovery, blue screen of death, etc. The OS can use the example HECI driver 404 to transmit a HECI command when a special event is to occur. In some examples, the HECI allocates a portion of memory that may be used to indicate the special event to the hardware agent 318.

If the example host engine 322 does not obtain a HECI command identifying a special event (block 606: NO), the example host engine 322 determines if a threshold amount of time has occurred (block 608). If the example host engine 322 determines that the threshold amount of time has not occurred (block 608: NO), control returns to block 608 until the threshold amount of time has occurred. If the example host engine 322 determines that the threshold amount of time has occurred (block 608: YES), control returns to block 604 to obtain additional and/or updated governing information (e.g., by transmitting a request for the governing information).

If the example host engine 322 obtains a HECI command identifying a special event (block 606: YES), the example dynamic framebuffer control circuitry 511 processes the governing data to determine the amount of memory available to use (block 610). As described above, during some firmware controlled protocols, portions of memory may not be initiated and/or available causing a limited amount of memory to be available for use during the firmware controlled protocol. Accordingly, the dynamic framebuffer control circuitry 511 can determine how much memory is available to determine if the resolution of one or more of the panels 324, 326 needs to be reduced and/or if one or more panels needs to be disabled to conserve memory needed to display images on the panels 324, 326.

At block 612, the example dynamic framebuffer control circuitry 511 determines the amount of memory needed to display the panel(s) at full resolution based on the panel information. For example, if each pixel corresponds to 256 different colors, 8 bits of memory is needed for each pixel of a display. Accordingly, for a single 4,000 pixel (4 k) display with approximately 8 million pixels, the example dynamic framebuffer control circuitry needs approximately 2.1 gigabytes of memory. Dual 4 k pixels outputting 256 different colors need approximately 4.2 gigabytes of memory.

At block 614, the example dynamic framebuffer control circuitry 511 determines if more than a threshold amount of memory (e.g., 50%, 75%, etc.) will be consumed for full resolution of the panel(s). The number of threshold and/or amount of thresholds may be based on user and/or manufacturer preferences. If the example dynamic framebuffer control circuitry 511 determines that more than a threshold amount of available memory is to be consumed for full resolution (block 614: YES), the example dynamic framebuffer control circuitry 511 transmits instructions to the graphics engine circuitry 314 of the example SoC/AP 312 that the panels are capable of operating at a lower resolution than the full resolution (block 616). In this manner, the graphic engine 314 will transmit frame information at the lower threshold, which results in less memory consumption than full resolution. The amount of the lower resolution (e.g., 1080, 720, 480, 360, 240) may be based on the amount of available memory (e.g., corresponding to various thresholds). In some examples, the dynamic framebuffer control circuitry 511 may additionally or alternatively transmit instructions to the SoC/AP 312 (e.g., via the AUX interface 504) to output the frame data at a refresh rate less than the maximum refresh rate to conserve memory and/or power resources.

If the example dynamic framebuffer control circuitry 511 determines that more than a threshold amount of available memory is not to be consumed for full resolution (block 614: NO), the example dynamic framebuffer control circuitry 511 transmits instructions to the graphics engine circuitry 314 of the example SoC/AP 312 that the panels are capable of operating a full resolution (block 618). In some examples, the dynamic framebuffer control circuitry 511 initiates the resolution to a lower resolution (e.g., without determining the amount of available memory and the amount of memory needed) and waits for an indication that the DRAM and/or other memory has been initiated and/or is otherwise available before adjusting from the low resolution to the higher resolution.

At block 620, the example eDP receiver 506 obtains image data (e.g., also referred to as frame data) from the graphics engine circuitry 314 corresponding to the indicated resolution. In some examples, frame data related to one more frames may be stored locally in internal storage of the hardware agent 318 (e.g., so that the CPU is not needed to display a static image, such as a message or logo). In such examples, the eDP receiver 506 may obtain the image data from the internal storage. At block 622 of FIG. 6A the example backlight control circuitry 410 and/or the example pixel format circuitry 412 determines the battery level and/or charging state (e.g., charging or not charging) of the computing device 300, 400, 500 based on the governing data. The battery level may include the amount of battery left, amount of time before the battery is dead, rate of battery depletion, etc. and the charging state may include the charging state (e.g., enabled or disabled), the rate of charge, etc. At block 624, the example backlight control circuitry 410 and/or the example pixel format circuitry 412 determines the panel angle(s) with respect to one another based on the governing data. The panel angle(s) relate to whether the panels are angled (a) such that the device is closed (e.g., the panels are folded in toward each other), (b) such that the first panel is used as a display and the second panel is used as a keyboard, (c) such that both panels are used as a display), (d) such that only one panel is being used (e.g., the panels are folded back to back so that the user can only view one panel). In examples where the panels are angled such that only one panel is being used, additional governing data (e.g., from a facial recognition sensor and/or camera) may help the pixel format circuitry 412 determine which panel is being viewed by a user.

At block 626, the example backlight control circuitry 410 determines the panel determines the ambient light conditions based on the governing data (e.g., from a light sensor or camera). For example, if the ambient light is low (e.g., the surroundings are dark), the example backlight control circuitry 410 may determine that the brightness can be lowered to conserve power. At block 628, the example backlight control circuitry 410 determines if the battery information and/or charging state corresponds to a reduced brightness. For example, if the battery level is below a threshold and the device is not charging or not being charged quick enough to maintain power, the backlight control circuitry 410 may determine that reduced brightness is desired to conserve power. If the battery level is below a threshold and the device is charging at a sufficient rage, the backlight control circuitry 410 may determine that reduced brightness is not needed. Additionally, the backlight control circuitry 410 may determine whether adjusting brightness is desired based on the special event. For example, a short, less power consuming event may correspond to less available battery power to trigger brightness reduction.

If the example backlight control circuitry 410 determines that the battery information and/or charging state corresponds to reduced brightness (block 628: YES), the example backlight control circuitry 410 adjusts the brightness based on the battery and/or charging state (block 630). The amount of brightness reduction may be based on the battery level and/or charging state (e.g., more aggressive reduction for lower battery levels with no charging). In examples where no backlight is used (e.g., OLED panels), blocks 628 and 630 may be performed by the pixel format circuitry 412 and the pixels can be controlled to reduce brightness via the example drivers 516. If the example backlight control circuitry 410 determines that the battery information and/or charging state does not correspond to reduced brightness (block 628: NO), the example backlight control circuitry 410 maintains full brightness of the panels 324, 326 (block 632).

At block 634, the example backlight control circuitry 410 determines if the panel angle(s) corresponds to a reduced brightness and/or panel disable. For example, if the panels 324, 326 are positioned at an angle that suggests that computing device is closed and the panel(s) 324, 326 cannot be seen, the backlight control circuitry 410 may determine that both panel(s) 324, 326 should be disabled. If the panels 324, 326 are positioned at an angle that suggests that the user can only view one panel, the backlight control circuitry may determine that one of the panel(s) should be disabled. Additionally, the backlight control circuitry 410 may determine whether to enable/disable and/or adjust brightness based on the special event. For example, a short, less power consuming event may correspond to no disable and/or full brightness regardless of the angle. If the example backlight control circuitry 410 determines that the panel angle(s) corresponds to reduced brightness (block 634: YES), the example backlight control circuitry 410 adjusts the brightness and/or disables one or more of the panels 324, 326 based on the panel angle(s) (block 636). In some examples, the dynamic framebuffer control circuitry 511 may also adjust the resolution of one of the panels based on the panel angle(s). For example, particular panel angles may correspond to one panel corresponding to a display and the other corresponding to a keyboard. In such examples, the dynamic framebuffer control circuitry 511 may lower the resolution of the display of the keyboard to conserver memory and/or power. If the example backlight control circuitry 410 determines that the panel angle(s) does not correspond to reduced brightness (block 634: NO), the example backlight control circuitry 410 maintains the previous determined brightness of the panels 324, 326 and keep both panels 324, 326 enabled (block 638).

At block 640 of FIG. 6C, the example backlight control circuitry 410 determines if the ambient conditions (e.g., ambient light levels) correspond to a reduced brightness. For example, the brighter the ambient light is, the more desirable it may be to have higher brightness so that a user can clearly see the screen. Additionally, the backlight control circuitry 410 may determine whether to adjust brightness based on the special event. For example, a short, less power consuming event may correspond to full brightness regardless of the angle. If the example backlight control circuitry 410 determines that the ambient conditions correspond to reduced brightness (block 640: YES), the example backlight control circuitry 410 adjusts the brightness of the panels 324, 326 based on the ambient conditions (e.g., the lower the ambient light, the lower the brightness) (block 642). If the example backlight control circuitry 410 determines that the ambient conditions do not correspond to reduced brightness (block 640: NO), the example backlight control circuitry 410 maintain the previous determined brightness of the panels 324, 326 (block 644).

At block 646, the example eDP receiver 506 obtains image data (e.g., frames) from the graphics engine circuitry 314 via the main link. In some examples, the image data is obtained from local storage. In some examples, image data includes a battery level to indicate the battery level to a user. In such examples, the hardware agent 318 may request the engine circuitry 314 to provide image data related to the battery level and/or the hardware agent 318 may storage image data to be able to display the battery level without data from the graphics engine circuitry 314. At block 648, the example pixel format circuitry 412 transmits instructions to the drivers 516 of the enabled LCD panel(s) 324, 326 (e.g., via the LCD interface 508) to control the driver based on the image data. The instructions cause the driver(s) to output colors corresponding to the instructions to render the image/frame based on the image data. At block 650, the example backlight control circuitry 410 transmits the desired brightness level to the backlight driver 514 of the panel(s) 324, 326 to cause the backlight driver 514 to illuminate the colors output by the pixels (e.g., based on the drivers 516) to output an image and/or frame at the desired brightness.

At block 652, the example host engine 322 requests and obtains updated governing information related to the senor(s) and/or other hardware (e.g., battery level, charging state, panel angle(s), available memory, ambient lighting, etc.). At block 654, the example host engine 322 determines if the special event has ended (e.g., based on a HECI message and/or data in a memory location). If the example host engine 322 determines that the special event has ended (block 654: YES), the instructions end. In some examples, during non-firmware events (e.g., when the OS has control of hardware), the OS may transmit instructions regarding power managment control of the panels based on user preferences and/or governing data and the example hardware agent 318 continues to power manage the panels 324, 326 based on the instructions from the OS. If the example host engine 322 determines that the special event has not ended (block 654: NO), the host engine 322 may determine if the governing information has changed (block 656). For example the host engine 322 determines if the charging state has changed, if the battery level has increased or decreased by more than a threshold, if the memory availability has changed (e.g., DRAM is not available), if the panel angles have changed by more than a threshold amount, if the ambient conditions have changed by more than a threshold amount, etc. If the example host engine 322 determines that the governing information has not changed (block 656: NO), control continues to block 646 and the hardware agent continues to output control the panels 324, 326 based on the previous brightness, resolution, and/or enablement settings. If the example host engine 322 determines that the governing information has changed (block 656: YES), control returns to block 610 to determine how to power manage the panels 324, 326 based on the updated governing data.

The below tables 1-3 illustrate an example of different governing data that may result in different decisions from the hardware agent 318 corresponding to difference control instructions. Although tables 1-3 illustrate an example of different thresholds, TCON decisions and control instructions, the thresholds, decisions, and instructions may be different (e.g., based on user and/or manufacturer preferences) and/or may be adjusted based on other factors.

TABLE 1

| Decision being made based on Hinge Sensor Data | | |
|---|---|---|
| Angel between Two Display Panel | TCON Decision | Control Instructions |
| 0 degree | Panel is closed, neither FW GOP driver not OS graphics (GFX) driver should initialize the panel. | TCON FW to make both the panel power off. |
| 90 degree | Both Panel is enabled, Laptop scenario. The panel that 90 degree inclined would consider as display and other one is for keyboard | TCON FW to update the resolution to fit one screen for rendering any image. The panel can be used for keyboard use case hence a soft screen HID driver to query other panel resolution as can be used as input device. |
| 180 degree | Each panel is enabled and in flat stage, tablet scenario. The framebuffer would be combination of both these panel. | TCON FW to update the framebuffer and manage the backlight or pixel dynamically based on the environmental information. |
| 360 degree | Both the screen is facing opposite to each other. Typically, a single screen scenario. | TCON FW to power-off the panel that is not user facing (it can make use of IPU to know the panel that is user facing). |

TABLE 2

| Decision being made based on Environmental Sensing Data: | | |
|---|---|---|
| Battery and Charging State | TCON Decision | Control Instructions |
| Battery beyond critical threshold level and charger attached | Panel doesn't require power conservation and system has ample power for operation | No Action Required |
| Battery beyond critical threshold level and no charger attached | | |
| Battery lower critical threshold level and charger attached | Panel requires power conservation. | Configure the backlight to the optimal power or inverse the polarity of the pixels in case of OLED panels. |
| Battery lower critical threshold level and no charger attached | | |

TABLE 3

| Decision being made based on Host Communication: | | |
|---|---|---|
| Host Communication | TCON Decision | Control Instructions |
| Prior Host CPU sends the DRAM being initialized HECI message | System is booting with memory constrain mode hence need to reserve memory resource. | Configure Framebuffer dynamically and continue to make use of both displays. |
| Post Host CPU sends the DRAM being initialized HECI message | No such memory restriction. | Read panel supported resolution from the EDID and configure the panel for higher resolution. |
| HECI message to inform about critical boot path | Boot with resource reservation mode, in terms of both memory and system power. | Configure the dynamic framebuffer and reduce the backlight control. |

FIG. 7 is an example timing diagram 700 illustrating conventional power management operation of panels. The example timing diagram 700 includes example system firmware (e.g. BIOS) 702, example platform hardware 704, and an example operating system 706. The firmware 702 and the operating system 706 is implemented in a SoC of a conventional computing device and the hardware corresponds to dual panels of a conventional computing device.

During a special event (e.g., boot, recovery, restart, startup, FW/OS update, etc.), the example system firmware 702 (a) configures panel general purpose inputs/outputs (GPIOs) of the platform hardware 704 using a GPIO module and (b) initializes panels based on device presence using a display module. Such conventional techniques enable power for both panels irrespective of screen orientation, thereby missing an opportunity to conserver power and/or memory. For example a dual panel display with screens facing opposite directions are both initialized even though initialization of one of the panels is likely not necessary. When initialized, conventional techniques operate panels on the highest resolution and highest brightness. Accordingly, conventional techniques do not consider environmental knowledge (e.g., battery level, charge, ambient light, available memory, etc.) to dynamically power manage the panels during special events. The system firmware 702 renders the OS Splash screen during boot to finalizing the setup of the dual screen. After the hardware is initiated, the system firmware 702 loads the operating system 706 and the OS manages the panels. The OS 706 initiates an updating managing by firmware 702 over reboot and the firmware updates with both screens enabled. Some firmware updates (e.g., critical firmware update) trigger at an early boot phase where systems are still operating in a memory constrained manner in the absence of DRAM. The only memory available may be SRAM, which may be limited in size. Accordingly, such conventional techniques correspond to costly use of limited and temporarily available memory.

Figure 8:
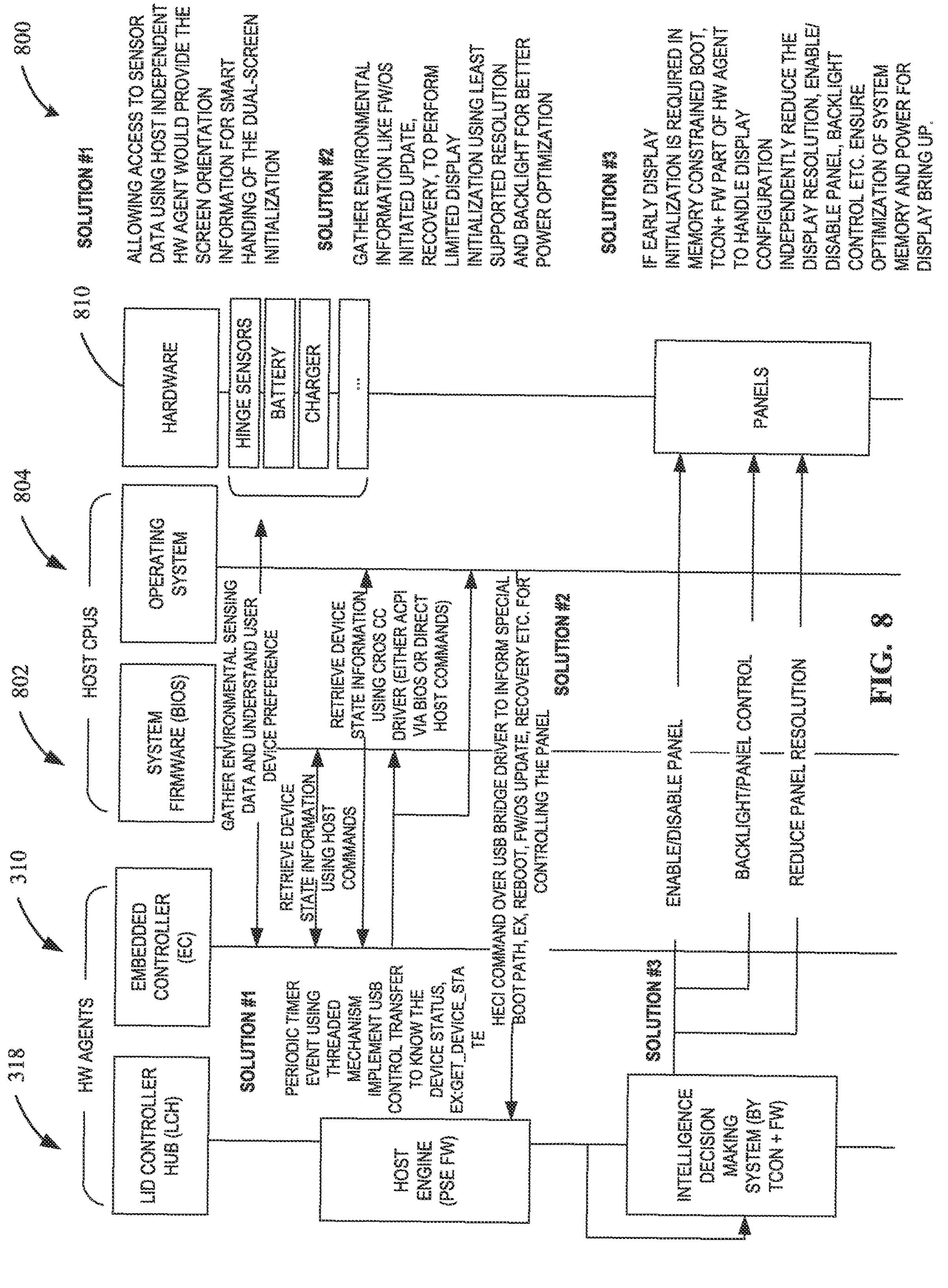
FIG. 8 is an example timing diagram described in conjunction with examples disclosed herein.

FIG. 8 is an example timing diagram 800 illustrating power management operation of panels using firmware and/or hardware in conjunction with examples disclosed herein. The example timing diagram 800 includes example hardware agent 318 and the example embedded controller 310 of FIG. 3. The example timing diagram 800 further includes example system firmware and an example operating system 804 which is implemented by the SoC/AP 312 of FIG. 3. The example hardware 810 corresponds to the example charger 302, the example battery 304, the example hinge sensors 308 and/or other sensors, and/or the example panels 324, 326.

Initially, the example embedded controller 310 of FIG. 8 gather environmental and/or governing sensing data like hinge sensor reading, battery capacity, charger state, and/or other relevant platform sensors. Then, the system firmware 802 or CrosEC driver of the OS 804 obtains environmental information from the embedded controller 310. The example hardware agent 318 periodically requests (e.g., using a time slicing threaded mechanism) the governing information from the system firmware 802 and/or OS 804. To inform the hardware agent 318 of a special event (e.g., a critical boot path), the OS 804 configures a USB interface to a host mode and sends a HECI message to inform the hardware agent 318 to perform panel management. In response to the HECI message, the example hardware agent 318 determines how to power manage the example panels 324, 326 based on the environmental data, as further described above. After determining how to power manage, the example hardware agent 318 controls the panels 324, 326 of the hardware 806 based on the determine power management protocol.

Allowing the hardware agent 318 access to the sensor data using a host independent HW agent provides screen orientation information for smart handling of a multi-screen initialization. Gathering environmental information for special events allows dynamic resolution selection and backlight reduction to conserver power and/or memory. Additionally, if early display initialization is required in a memory constraint boot, the TCON firmware part of the HW agent 318 to handle panel configuration and brightness independent of the OS to ensure system efficiency of memory and power during firmware control events.

Figure 9:
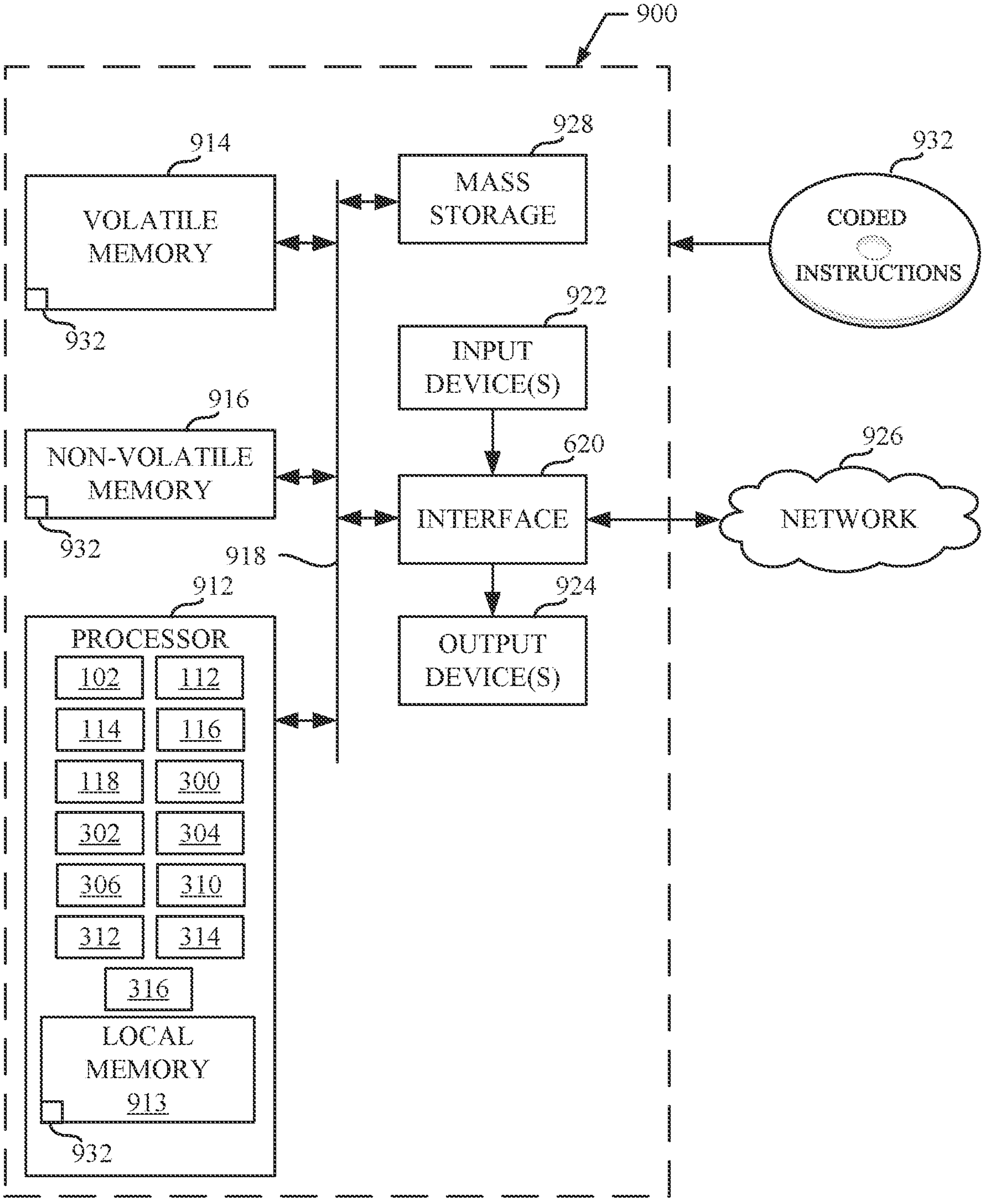
FIG. 9 is a block diagram of an example processing platform including processor circuitry structured to execute the example machine readable instructions of FIGS. 6A-6C to implement the example hardware agent of FIGS. 6A-6C.

FIG. 9 is a block diagram of an example processor platform 900 structured to execute and/or instantiate the machine readable instructions and/or operations of FIGS. 6A-6C to implement the hardware agent 318 of FIGS. 6A-6C. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the host engine 322, the example pixel format circuitry 412, the example backlight control circuitry 410, the AUX channel interface 504, the example eDP receiver 506, the example LCD interface 508, the example device status and control circuitry 510, and the example dynamic framebuffer control circuitry 511 of FIGS. 6A-6C.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine readable instructions of FIGS. 6A-6C, may be stored in the mass storage device 928, in the volatile memory 914, in the non-volatile memory 916, and/or on a removable non-transitory computer readable storage medium such as a CD or DVD.

Figure 10:
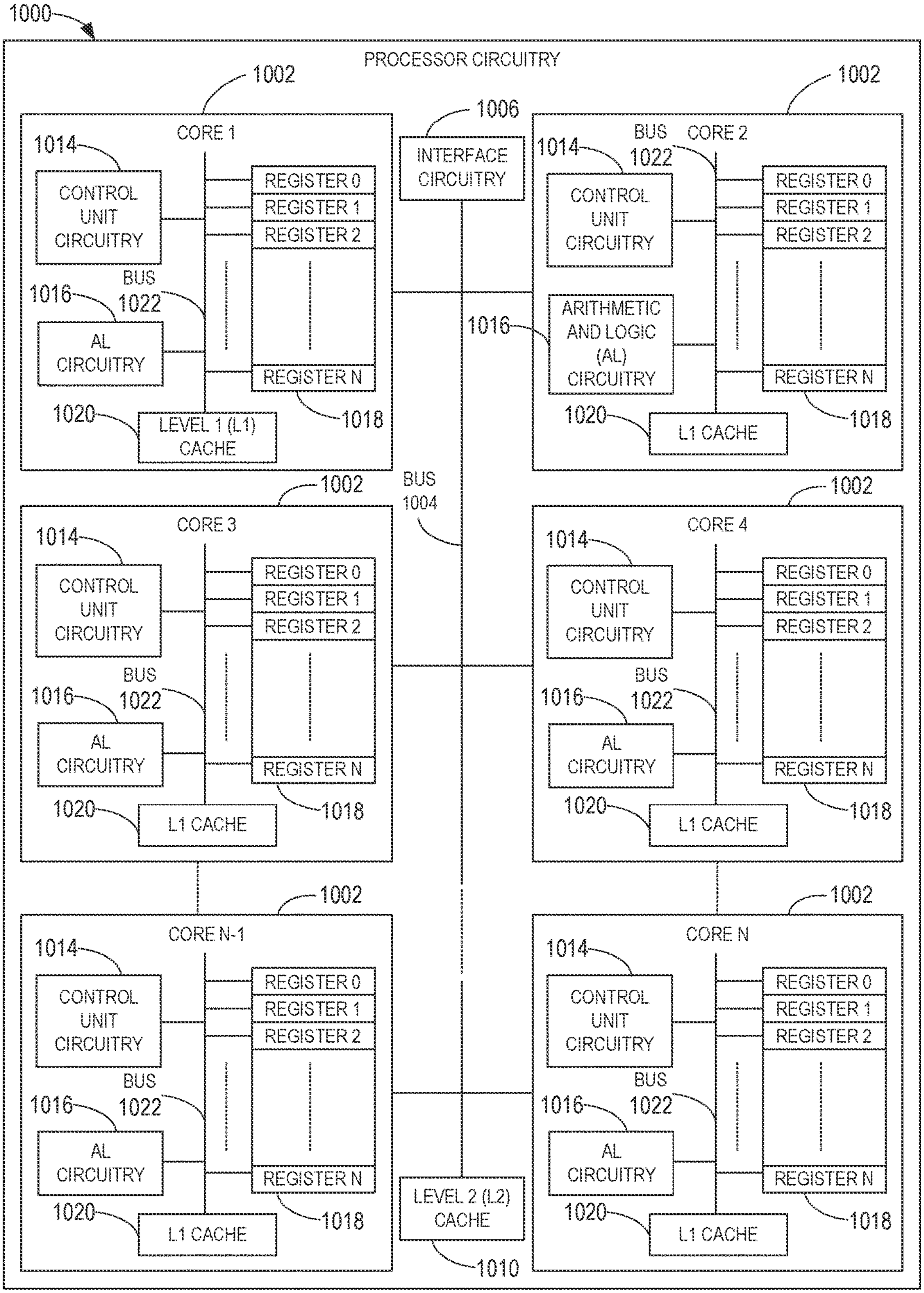
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor_00 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowchart of FIGS. 4 and/or 5

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic, and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The bus 1022 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
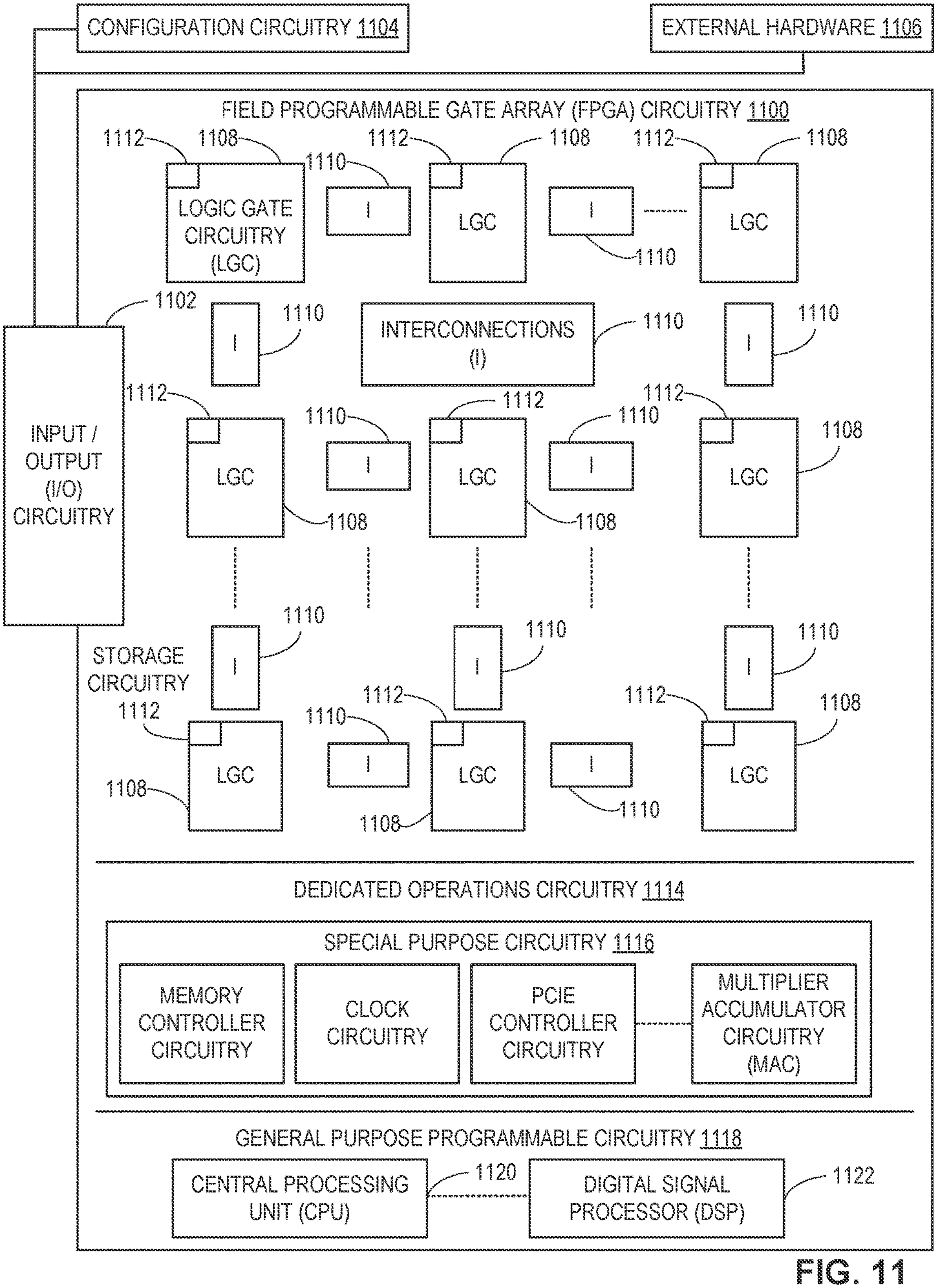
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowchart of FIG. 4-5 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIG. 4-5. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowchart of FIG. 4-5. As such, the FPGA circuitry 1100 may be structured to effectively instantiate some or all of the machine readable instructions of the flowchart of FIG. 4-5 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIG. 11 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIG. 4-5 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowchart of FIG. 4-5 may be executed by one or more of the cores 1002 of FIG. 10 and a second portion of the machine readable instructions represented by the flowchart of FIG. 4-5 may be executed by the FPGA circuitry 1100 of FIG. 11.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
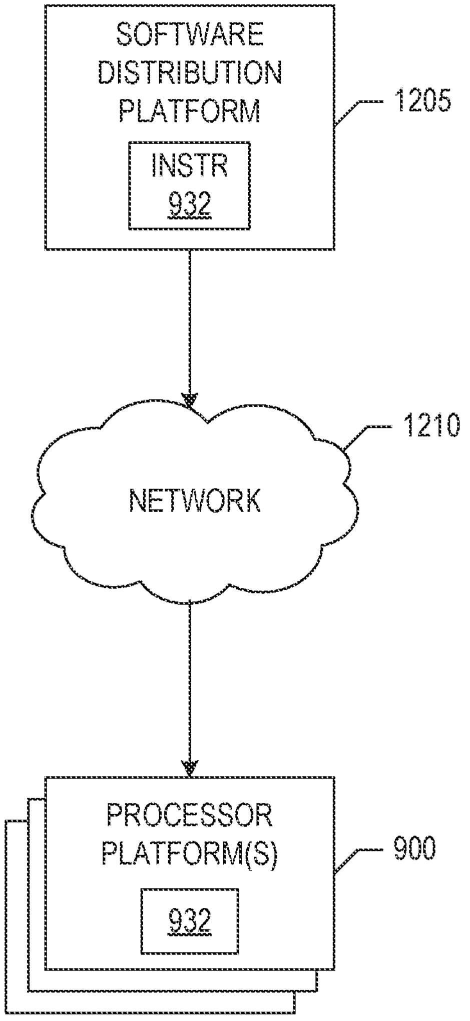
FIG. 12 is a block diagram of an example software distribution platform (e.g., one or more servers) to distribute software (e.g., software corresponding to the example machine readable instructions of FIGS. 6A-6C) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 600 of FIGS. 6A-6C, as described above. The one or more servers of the example software distribution platform 1205 are in communication with a network 1210, which may correspond to any one or more of the Internet and/or any example network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 600 of FIGS. 6A-6C, may be downloaded to the example processor platform 900, which is to execute the machine readable instructions 932 to implement the ISA managing circuitry 110 and/or the micro-code processing circuitry 111. In some example, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

Example methods, apparatus, systems, and articles of manufacture to perform platform agnostic control of a display using a hardware agent are disclosed herein. Further examples and combinations thereof include the following: Example 1 includes an apparatus to dynamically manage a panel during a boot protocol, the apparatus comprising memory, instructions in the apparatus, and hardware agent to execute the instructions to obtain a battery level, and during a boot protocol determine that the battery level is below a threshold, determine an amount of brightness for a panel based on the battery level, the amount of brightness being less than a maximum brightness of the panel, and transmit instructions to the panel to cause the panel to operate at the determined amount of brightness.

Example 2 includes the apparatus of example 1, wherein the hardware agent is to obtain the battery level from a controller via a system-on-chip.

Example 3 includes the apparatus of example 1, wherein the instructions are firmware instructions.

Example 4 includes the apparatus of example 1, wherein the hardware agent is to request environmental information from a system-on-chip, the environmental information including the battery level.

Example 5 includes the apparatus of example 4, wherein the hardware agent is to determine a charging state based on the environmental information, and determine the amount of brightness in response to determining that no charging is occurring.

Example 6 includes the apparatus of example 1, wherein the hardware agent is to determine that the boot protocol is to occur in response to obtaining a command from a system-on-chip.

Example 7 includes the apparatus of example 1, wherein the hardware agent is to determine the amount of brightness based on the boot protocol.

Example 8 includes the apparatus of example 1, wherein the hardware agent is to determine the amount of brightness based on a rate of battery depletion.

Example 9 includes the apparatus of example 1, wherein the hardware agent is to obtain frame data from a system-on-chip, and transmit instructions to the panel to display a frame based on the frame data.

Example 10 includes the apparatus of example 1, wherein the hardware agent includes internal storage, the hardware agent is to obtain frame data from the internal storage, and transmit instruction to the panel to display a frame based on the frame data.

Example 11 includes a non-transitory computer readable medium comprising instructions which, when executed, cause a machine to at least obtain a battery level, and during a boot protocol determine that the battery level is below a threshold, determine an amount of brightness for a panel based on the battery level, the amount of brightness being less than a maximum brightness of the panel, and transmit instructions to the panel to cause the panel to operate at the determined amount of brightness.

Example 12 includes the computer readable medium of example 11, wherein the instructions cause the machine to obtain the battery level from a controller via a system-on-chip.

Example 13 includes the computer readable medium of example 11, wherein the instructions are firmware instructions.

Example 14 includes the computer readable medium of example 11, wherein the instructions cause the machine to request environmental information from a system-on-chip, the environmental information including the battery level.

Example 15 includes the computer readable medium of example 14, wherein the instructions cause the machine to determine a charging state based on the environmental information, and determine the amount of brightness in response to determining that no charging is occurring.

Example 16 includes the computer readable medium of example 11, wherein the instructions cause the machine to determine that the boot protocol is to occur in response to obtaining a command from a system-on-chip.

Example 17 includes the computer readable medium of example 11, wherein the instructions cause the machine to determine the amount of brightness based on the boot protocol.

Example 18 includes the computer readable medium of example 11, wherein the instructions cause the machine to determine the amount of brightness based on a rate of battery depletion.

Example 19 includes the computer readable medium of example 11, wherein the instructions cause the machine to obtain frame data from a system-on-chip, and transmit instructions to the panel to display a frame based on the frame data.

Example 20 includes the computer readable medium of example 11, wherein the instructions cause the machine to obtain frame data from internal storage, and transmit instruction to the panel to display a frame based on the frame data.

Example 21 includes an apparatus to dynamically manage a panel during a boot protocol, the apparatus comprising interface circuitry to obtain a battery level, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to during a boot protocol perform at least one of the first operations, the second operations, or the third operations to instantiate backlight control circuitry to determine that the battery level is below a threshold, determine an amount of brightness for a panel based on the battery level, the amount of brightness being less than a maximum brightness of the panel, and transmit instructions to the panel to cause the panel to operate at the determined amount of brightness.

Example 22 includes the apparatus of example 21, wherein the interface circuitry is to obtain the battery level from a controller via a system-on-chip.

Example 23 includes the apparatus of example 21, wherein the instructions are firmware instructions.

Example 24 includes the apparatus of example 21, wherein the processor circuitry is to instantiate host engine circuitry to request environmental information from a system-on-chip, the environmental information including the battery level.

Example 25 includes the apparatus of example 24, wherein the backlight control circuitry is to determine a charging state based on the environmental information, and determine the amount of brightness in response to determining that no charging is occurring.

Example 26 includes the apparatus of example 21, wherein the processor circuitry is to instantiate host engine circuitry to determine that the boot protocol is to occur in response to obtaining a command from a system-on-chip.

Example 27 includes the apparatus of example 21, wherein the backlight control circuitry is to determine the amount of brightness based on the boot protocol.

Example 28 includes the apparatus of example 21, wherein the backlight control circuitry is to determine the amount of brightness based on a rate of battery depletion.

Example 29 includes the apparatus of example 21, wherein the interface circuitry is first interface circuitry, further including second interface circuitry to obtain frame data from a system-on-chip, and third interface circuitry to transmit instructions to the panel to display a frame based on the frame data.

Example 30 includes the apparatus of example 21, wherein the interface circuitry is first interface circuitry, further including second interface circuitry to obtain frame data from internal storage, and third interface circuitry to transmit instruction to the panel to display a frame based on the frame data.

Example 31 includes a method to dynamically manage a panel during a boot protocol, the method comprising obtaining a battery level, and during a boot protocol determining, by executing an instruction with a hardware agent, that the battery level is below a threshold, determining, by executing an instruction with the hardware agent, an amount of brightness for a panel based on the battery level, the amount of brightness being less than a maximum brightness of the panel, and transmitting instructions to the panel to cause the panel to operate at the determined amount of brightness.

Example 32 includes the method of example 31, further including obtaining the battery level from a controller via a system-on-chip.

Example 33 includes the method of example 31, wherein the instructions are firmware instructions.

Example 34 includes the method of example 31, further including requesting environmental information from a system-on-chip, the environmental information including the battery level.

Example 35 includes the method of example 34, further including determining a charging state based on the environmental information, and determining the amount of brightness in response to determining that no charging is occurring.

Example 36 includes the method of example 31, further including determining that the boot protocol is to occur in response to obtaining a command from a system-on-chip.

Example 37 includes the method of example 31, further including determining the amount of brightness based on the boot protocol.

Example 38 includes the method of example 31, further including determining the amount of brightness based on a rate of battery depletion.

Example 39 includes the method of example 31, further including obtaining frame data from a system-on-chip, and transmitting instructions to the panel to display a frame based on the frame data.

Example 40 includes the method of example 31, further including obtaining frame data from internal storage, and transmitting instruction to the panel to display a frame based on the frame data.

Example 41 includes an apparatus to dynamically manage a panel during a boot protocol, the apparatus comprising memory, instructions in the apparatus, and hardware agent to execute the instructions to obtain sensor data corresponding to an angle corresponding to a first panel and a second panel, during a firmware-based protocol determine that that the first panel should be disabled based on the angle, and transmit instructions to the first panel to disable the first panel.

Example 42 includes the apparatus of example 41, wherein the hardware agent is to obtain the sensor data from a controller via a system-on-chip.

Example 43 includes the apparatus of example 41, wherein the instructions are firmware instructions.

Example 44 includes the apparatus of example 41, wherein the hardware agent is to request environmental information from a system-on-chip, the environmental information including the sensor data.

Example 45 includes the apparatus of example 41, wherein the hardware agent is to determine that the boot protocol is to occur in response to obtaining a command from a system-on-chip.

Example 46 includes the apparatus of example 41, wherein the hardware agent is to determine that the first panel should be disabled based on the boot protocol.

Example 47 includes the apparatus of example 41, wherein the hardware agent is to determine that the second panel is to be disabled, and transmit instructions to the second panel to disable the second panel.

Example 48 includes the apparatus of example 41, wherein the hardware agent is to obtain frame data from a system-on-chip, and transmit instructions to the second panel to display a frame based on the frame data.

Example 49 includes the apparatus of example 41, wherein the hardware agent is to, during the firmware-based protocol obtain additional sensor data, determine that the angle corresponding to the first panel and the second panel has changed, determine that that the first panel should be enabled based on the angle, and transmit instructions to the first panel to enable the first panel.

Example 50 includes a non-transitory computer readable medium comprising instructions which, when executed, cause a machine to at least obtain sensor data corresponding to an angle corresponding to a first panel and a second panel, during a firmware-based protocol determine that that the first panel should be disabled based on the angle, and transmit instructions to the first panel to disable the first panel.

Example 51 includes the computer readable medium of example 50, wherein the instructions cause the machine to obtain the sensor data from a controller via a system-on-chip.

Example 52 includes the computer readable medium of example 50, wherein the instructions are firmware instructions.

Example 53 includes the computer readable medium of example 50, wherein the instructions cause the machine to request environmental information from a system-on-chip, the environmental information including the sensor data.

Example 54 includes the computer readable medium of example 50, wherein the instructions cause the machine to determine that the firmware-based protocol is to occur in response to obtaining a command from a system-on-chip.

Example 55 includes the computer readable medium of example 50, wherein the instructions cause the machine to determine that the first panel should be disabled based on the firmware-based protocol.

Example 56 includes the computer readable medium of example 50 wherein the instructions cause the machine to determine that the second panel is to be disabled, and transmit instructions to the second panel to disable the second panel.

Example 57 includes the computer readable medium of example 50, wherein the instructions cause the machine to obtain frame data from a system-on-chip, and transmit instructions to the second panel to display a frame based on the frame data.

Example 58 includes the computer readable medium of example 50, wherein the instructions cause the machine to, during the firmware-based protocol obtain additional sensor data, determine that the angle corresponding to the first panel and the second panel has changed, determine that that the first panel should be enabled based on the angle, and transmit instructions to the first panel to enable the first panel.

Example 59 includes an apparatus to dynamically manage a panel during a boot protocol, the apparatus comprising interface circuitry to obtain sensor data corresponding to an angle corresponding to a first panel and a second panel, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to during a firmware-based protocol perform at least one of the first operations, the second operations, or the third operations to instantiate backlight control circuitry to determine that that the first panel should be disabled based on the angle, and transmit instructions to the first panel to disable the first panel.

Example 60 includes the apparatus of example 59, wherein the interface circuitry is to obtain the sensor data from a controller via a system-on-chip.

Example 61 includes the apparatus of example 59, wherein the instructions are firmware instructions.

Example 62 includes the apparatus of example 59, wherein the processor circuitry is to instantiate host engine circuitry to request environmental information from a system-on-chip, the environmental information including the sensor data.

Example 63 includes the apparatus of example 59, wherein the processor circuitry is to instantiate host engine circuitry to determine that the boot protocol is to occur in response to obtaining a command from a system-on-chip.

Example 64 includes the apparatus of example 59, wherein the backlight control circuitry is to determine that the first panel should be disabled based on the boot protocol.

Example 65 includes the apparatus of example 59, wherein the backlight control circuitry is to determine that the second panel is to be disabled, and transmit instructions to the second panel to disable the second panel.

Example 66 includes the apparatus of example 59, wherein the interface circuitry is first interface circuitry, further including second interface circuitry to obtain frame data from a system-on-chip, and third interface circuitry to transmit instructions to the second panel to display a frame based on the frame data.

Example 67 includes the apparatus of example 59, wherein, during the firmware-based protocol the interface circuitry is to obtain additional sensor data, and backlight control circuitry to determine that the angle corresponding to the first panel and the second panel has changed, determine that that the first panel should be enabled based on the angle, and transmit instructions to the first panel to enable the first panel.

Example 68 includes a method to dynamically manage a panel during a boot protocol, the method comprising obtaining sensor data corresponding to an angle corresponding to a first panel and a second panel, during a firmware-based protocol determining, by executing an instruction with a hardware agent, that that the first panel should be disabled based on the angle, and transmitting instructions to the first panel to disable the first panel.

Example 69 includes the method of example 68, further including obtaining the sensor data from a controller via a system-on-chip.

Example 70 includes the method of example 68, wherein the instructions are firmware instructions.

Example 71 includes the method of example 68, further including requesting environmental information from a system-on-chip, the environmental information including the sensor data.

Example 72 includes the method of example 68, further including determining that the boot protocol is to occur in response to obtaining a command from a system-on-chip.

Example 73 includes the method of example 68, further including determining that the first panel should be disabled based on the boot protocol.

Example 74 includes the method of example 68, further including determining that the second panel is to be disabled, and transmitting instructions to the second panel to disable the second panel.

Example 75 includes the method of example 68, further including obtaining frame data from a system-on-chip, and transmitting instructions to the second panel to display a frame based on the frame data.

Example 76 includes the method of example 68, further including, during the firmware-based protocol obtaining additional sensor data, determining that the angle corresponding to the first panel and the second panel has changed, determining that that the first panel should be enabled based on the angle, and transmitting instructions to the first panel to enable the first panel.

Example 77 includes an apparatus to dynamically manage a panel during a boot protocol, the apparatus comprising memory, instructions in the apparatus, and hardware agent to execute the instructions to obtain a battery level, and when an operating system is not in control of the hardware transmit, to a system-on-chip, a first indication that a panel is capable of operating at a resolution lower than a maximum resolution of the panel, obtain, from the system-on-chip, first frame data corresponding to the resolution, instruct the panel to display a first frame corresponding to the first frame data at the resolution, determine that the memory has been initiated, transmit, to the system-on-chip, a second indication that the panel is capable of operating at the maximum resolution of the panel, obtain, from the system-on-chip, second frame data corresponding to the maximum resolution, and instruct the panel to display a second frame corresponding to the second frame data at the maximum resolution.

Example 78 includes the apparatus of example 77, wherein the hardware agent is to determine an amount of memory needed to output a display on the panel at maximum resolution, and transmit the first indication in response to determining that the amount of memory is above a threshold.

Example 79 includes the apparatus of example 77, wherein the instructions are firmware instructions.

Example 80 includes the apparatus of example 77, wherein the hardware agent is to determine that the operating system is not in control of the hardware in response to obtaining a command from the system-on-chip.

Example 81 includes the apparatus of example 77, wherein the hardware agent is to determine the resolution based on the boot protocol.

Example 82 includes the apparatus of example 77, wherein the hardware agent is to transmit the first indication that a panel is capable of operating at the resolution lower to display information related to the battery level.

Example 83 includes the apparatus of example 77, wherein the hardware agent is to transmit the first indication that a panel is capable of operating at the resolution lower to conserve power.

Example 84 includes a non-transitory computer readable medium comprising instructions which, when executed, cause a machine to at least obtain a battery level, and when an operating system is not in control of the hardware transmit, to a system-on-chip, a first indication that a panel is capable of operating at a resolution lower than a maximum resolution of the panel, obtain, from the system-on-chip, first frame data corresponding to the resolution, instruct the panel to display a first frame corresponding to the first frame data at the resolution, determine that memory has been initiated, transmit, to the system-on-chip, a second indication that the panel is capable of operating at the maximum resolution of the panel, obtain, from the system-on-chip, second frame data corresponding to the maximum resolution, and instruct the panel to display a second frame corresponding to the second frame data at the maximum resolution.

Example 85 includes the computer readable medium of example 84, wherein the instructions cause the machine to determine an amount of memory needed to output a display on the panel at maximum resolution, and transmit the first indication in response to determining that the amount of memory is above a threshold.

Example 86 includes the computer readable medium of example 84, wherein the instructions are firmware instructions.

Example 87 includes the computer readable medium of example 84, wherein the instructions cause the machine to determine that the operating system is not in control of the hardware in response to obtaining a command from the system-on-chip.

Example 88 includes the computer readable medium of example 84, wherein the instructions cause the machine to determine the resolution based on a boot protocol.

Example 89 includes the computer readable medium of example 84, wherein the instructions cause the machine to transmit the first indication that a panel is capable of operating at the resolution lower to display information related to the battery level.

Example 90 includes the computer readable medium of example 84, wherein the instructions cause the machine to transmit the first indication that a panel is capable of operating at the resolution lower to conserve power.

Example 91 includes an apparatus to dynamically manage a panel during a boot protocol, the apparatus comprising interface circuitry to obtain a battery level, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to, when an operating system is not in control of the hardware, perform at least one of the first operations, the second operations, or the third operations to instantiate dynamic framebuffer control circuitry to transmit, to a system-on-chip, a first indication that a panel is capable of operating at a resolution lower than a maximum resolution of the panel, host engine circuitry to obtain, from the system-on-chip, first frame data corresponding to the resolution, the dynamic framebuffer control circuitry to instruct the panel to display a first frame corresponding to the first frame data at the resolution, determine that memory has been initiated, and transmit, to the system-on-chip, a second indication that the panel is capable of operating at the maximum resolution of the panel, the host engine circuitry to obtain, from the system-on-chip, second frame data corresponding to the maximum resolution, and the dynamic framebuffer control circuitry to instruct the panel to display a second frame corresponding to the second frame data at the maximum resolution.

Example 92 includes the apparatus of example 91, wherein the dynamic framebuffer control circuitry is to determine an amount of memory needed to output a display on the panel at maximum resolution, and transmit the first indication in response to determining that the amount of memory is above a threshold.

Example 93 includes the apparatus of example 91, wherein the instructions are firmware instructions.

Example 94 includes the apparatus of example 91, wherein the host engine circuitry is to determine that the operating system is not in control of the hardware in response to obtaining a command from the system-on-chip.

Example 95 includes the apparatus of example 91, wherein the dynamic framebuffer control circuitry is to determine the resolution based on the boot protocol.

Example 96 includes the apparatus of example 91, wherein the dynamic framebuffer control circuitry is to transmit the first indication that a panel is capable of operating at the resolution lower to display information related to the battery level.

Example 97 includes the apparatus of example 91, wherein the dynamic framebuffer control circuitry is to transmit the first indication that a panel is capable of operating at the resolution lower to conserve power.

Example 98 includes an method to dynamically manage a panel during a boot protocol, the method comprising obtaining a battery level, and when an operating system is not in control of the hardware transmitting, to a system-on-chip, a first indication that a panel is capable of operating at a resolution lower than a maximum resolution of the panel, obtaining, from the system-on-chip, first frame data corresponding to the resolution, instructing, by executing an instruction with a hardware agent, the panel to display a first frame corresponding to the first frame data at the resolution, determining, by executing an instruction with the hardware agent, that memory has been initiated, transmitting, to the system-on-chip, a second indication that the panel is capable of operating at the maximum resolution of the panel, obtaining, from the system-on-chip, second frame data corresponding to the maximum resolution, and instructing, by executing an instruction with the hardware agent, the panel to display a second frame corresponding to the second frame data at the maximum resolution.

Example 99 includes the method of example 98, further including determining an amount of memory needed to output a display on the panel at maximum resolution, and transmitting the first indication in response to determining that the amount of memory is above a threshold.

Example 100 includes the method of example 98, wherein the instructions are firmware instructions.

Example 101 includes the method of example 98, further including determining that the operating system is not in control of the hardware in response to obtaining a command from the system-on-chip.

Example 102 includes the method of example 98, further including determining the resolution based on the boot protocol.

Example 103 includes the method of example 98, further including transmitting the first indication that a panel is capable of operating at the resolution lower to display information related to the battery level.

Example 104 includes the method of example 98, further including transmitting the first indication that a panel is capable of operating at the resolution lower to conserve power.

From the foregoing, it will be appreciated that example systems, methods, apparatus, and articles of manufacture have been disclosed that perform platform agnostic control of a display using a hardware agent. The disclosed systems, methods, apparatus, and articles of manufacture provide a hardware agent that manages operation of a panel when the operating system of a computing device is not in control (e.g., during firmware control, OS updates, FW updates, boot protocols, recovery, reset, startup, etc.). In this manner, power consumption and/or memory consumption can be reduced when the OS is not able to manage the panels. Accordingly, the disclosed systems, methods, apparatus, and articles of manufacture are accordingly directed to one or more improvement(s) in the operation of a machine such as a computer or other electronic.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to dynamically manage a panel during a boot protocol, the apparatus comprising:
- memory;
- instructions in the apparatus; and
- a hardware agent to execute the instructions to:
  - obtain a battery level and a rate of battery depletion; and
  - during a boot protocol:
    - determine that the battery level is below a threshold;
    - determine an amount of panel brightness as a function of the battery level and a the rate of battery depletion, the rate of battery depletion being based on an operating state of the apparatus, the amount of panel brightness being less than a maximum brightness of the panel; and
    - transmit instructions to a driver corresponding to the panel to cause the panel to operate at the amount of panel brightness.

2. The apparatus of claim 1, wherein the hardware agent is to obtain the battery level from a controller via a system-on-chip.

3. The apparatus of claim 1, wherein the instructions are firmware instructions.

4. The apparatus of claim 1, wherein the hardware agent is to request environmental information from a system-on-chip, the environmental information including the battery level.

5. The apparatus of claim 4, wherein the hardware agent is to:
- determine a charging state based on the environmental information; and
- determine the amount of panel brightness in response to determining that no charging is occurring.

6. The apparatus of claim 1, wherein the hardware agent is to determine that the boot protocol is to occur in response to obtaining a command from a system-on-chip.

7. The apparatus of claim 1, wherein the hardware agent is to determine the amount of panel brightness based on the boot protocol.

8. The apparatus of claim 1, wherein the hardware agent is to:
- obtain frame data from a system-on-chip; and
- transmit instructions to the driver corresponding to the panel to display a frame based on the frame data.

9. The apparatus of claim 1, wherein the hardware agent includes internal storage, the hardware agent is to:
- obtain frame data from the internal storage; and
- transmit instructions to the driver corresponding to the panel to display a frame based on the frame data.

10. The apparatus of claim 1, wherein the hardware agent is to access sensor data via a host embedded control interface to calculate the rate of battery depletion based on operating state of the apparatus.

11. A non-transitory computer readable medium comprising instructions that cause a machine to at least:
- obtain a battery level and a rate of battery depletion; and
- during a boot protocol:
  - determine that the battery level is below a threshold;
  - determine a panel brightness for a panel as a function of the battery level and the rate of battery depletion, the rate of battery depletion being based on an operating state of the machine, the panel brightness being less than a maximum brightness of the panel; and transmit instructions to a driver of the panel to cause the panel to operate at the determined panel brightness.

12. The computer readable medium of claim 11, wherein the instructions cause the machine to obtain the battery level from a controller via a system-on-chip.

13. The computer readable medium of claim 11, wherein the instructions are firmware instructions.

14. The computer readable medium of claim 11, wherein the instructions cause the machine to request environmental information from a system-on-chip, the environmental information including the battery level.

15. The computer readable medium of claim 14, wherein the instructions cause the machine to:

determine a charging state based on the environmental information; and determine the panel brightness in response to determining that no charging is occurring.

16. The computer readable medium of claim 11, wherein the instructions cause the machine to determine that the boot protocol is to occur in response to obtaining a command from a system-on-chip.

17. The computer readable medium of claim 11, wherein the instructions cause the machine to determine the panel brightness based on the boot protocol.

18. The computer readable medium of claim 11, wherein the instructions cause the machine to:

obtain frame data from a system-on-chip; and transmit instructions to the driver to display a frame on the panel based on the frame data.

19. The computer readable medium of claim 11, wherein the instructions cause the machine to:

obtain frame data from internal storage; and transmit instruction to the driver to display a frame on the panel based on the frame data.

20. An apparatus to dynamically manage a panel during a boot protocol, the apparatus comprising:

interface circuitry to obtain a battery level and a rate of battery depletion; and processor circuitry to at least one of execute or instantiate instructions to:

determine that the battery level is below a threshold;

determine an amount of panel brightness as a function of the battery level and the rate of battery depletion, the rate of battery depletion being based on an operating state of the apparatus, the amount of panel brightness being less than a maximum brightness of the panel; and transmit instructions to the panel to cause the panel to operate at the amount of panel brightness.

21. The apparatus of claim 20, wherein the interface circuitry is to obtain the battery level from a controller via a system-on-chip.

22. The apparatus of claim 20, wherein the instructions are firmware instructions.

23. The apparatus of claim 20, wherein the processor circuitry is to request environmental information from a system-on-chip, the environmental information including the battery level.

24. The apparatus of claim 23, wherein the processor circuitry is to:

determine a charging state based on the environmental information; and determine the amount of panel brightness in response to determining that no charging is occurring.

25. The apparatus of claim 20, wherein the processor circuitry is to determine that the boot protocol is to occur in response to obtaining a command from a system-on-chip.

* * * * *